(12) United States Patent
Hansen

(10) Patent No.: US 9,586,124 B2
(45) Date of Patent: Mar. 7, 2017

(54) RFID TAG READ TRIGGERED IMAGE AND VIDEO CAPTURE EVENT TIMING METHOD

(71) Applicant: Innovative Timing Systems, LLC, St. Louis, MO (US)

(72) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 543 days.

(21) Appl. No.: 13/946,238

(22) Filed: Jul. 19, 2013

(65) Prior Publication Data

US 2013/0307988 A1  Nov. 21, 2013

Related U.S. Application Data

(63) Continuation of application No. PCT/US2012/022126, filed on Jan. 20, 2012.
(Continued)

(51) Int. Cl.
*A63B 71/06* (2006.01)
*G07C 1/24* (2006.01)
(Continued)

(52) U.S. Cl.
CPC .......... *A63B 71/06* (2013.01); *G06K 7/10425* (2013.01); *G07C 1/24* (2013.01); *H04N 7/188* (2013.01)

(58) Field of Classification Search
CPC ... G07F 17/3276; G07F 17/3239; G07C 1/24; H04N 7/188; H04N 2201/3215;
(Continued)

(56) References Cited

U.S. PATENT DOCUMENTS 4,142,680 A   3/1979 Oswald et al.
4,505,595 A   3/1985 Rose et al.
(Continued)

FOREIGN PATENT DOCUMENTS

EP       2009595 A    12/2008
JP    2003-327331 A   11/2003
(Continued)

OTHER PUBLICATIONS

PCT Search Report, PCT US 2010-022559, Jan. 29, 2010.
(Continued)

*Primary Examiner* — Obafemi Sosanya
(74) *Attorney, Agent, or Firm* — Polster Lieder

(57) ABSTRACT

A method for automatically taking an image of a participant in an event with a timing system determining a time of a passing a detection line on a route by a participant having an RFID tag, the system includes a RFID tag reader system obtaining the RFID tag numbers of the RFID tag in RFID tag reads, time stamping each RFID tag read, and transmitting a tag read message including the RFID tag number, an image capture device capturing images of participants when in proximity to one of the monitored points, generating image data, an image capture system creating an image capture message including the image data, and transmitting the image capture message, and the timing system determining the RFID tag number within the tag read messages, associating the received image data with the identified participant, and storing the image data associated with the determined RFID tag number.

17 Claims, 9 Drawing Sheets

Related U.S. Application Data

(60) Provisional application No. 61/434,769, filed on Jan. 20, 2011.

(51) Int. Cl.
  *G06K 7/10* (2006.01)
  *H04N 7/18* (2006.01)

(58) Field of Classification Search
  CPC .............. H04N 5/3765; H04N 21/4223; A63B 24/0021; A63B 2225/54; A63B 2024/0025
  See application file for complete search history.

(56) References Cited

U.S. PATENT DOCUMENTS

| | | | |
|---|---|---|---|
| 4,812,845 | A | 3/1989 | Yamada et al. |
| 4,918,630 | A | 4/1990 | Plouff et al. |
| 5,091,895 | A | 2/1992 | Chatwin et al. |
| 5,140,307 | A | 8/1992 | Rebetez et al. |
| 5,436,611 | A | 7/1995 | Arlinghaus, Jr. |
| 5,493,805 | A | 2/1996 | Penuela et al. |
| 5,511,045 | A | 4/1996 | Sasaki et al. |
| 5,604,485 | A | 2/1997 | Lauro et al. |
| 5,696,481 | A | 12/1997 | Pejas et al. |
| 5,812,049 | A | 9/1998 | Uzi |
| 5,821,902 | A | 10/1998 | Keen |
| 5,883,582 | A | 3/1999 | Bowers et al. |
| 5,973,598 | A | 10/1999 | Beigel |
| 6,008,773 | A | 12/1999 | Matsuoka et al. |
| 6,100,804 | A | 8/2000 | Brady et al. |
| 6,204,813 | B1 | 3/2001 | Wadell et al. |
| 6,278,413 | B1 | 8/2001 | Hugh et al. |
| 6,340,932 | B1 | 1/2002 | Rodgers et al. |
| 6,369,697 | B1 | 4/2002 | Poole |
| 6,466,178 | B1 | 10/2002 | Muterspaugh |
| 6,496,806 | B1 | 12/2002 | Horwitz et al. |
| 6,512,478 | B1 | 1/2003 | Chien |
| 6,570,487 | B1 | 5/2003 | Steeves |
| 6,577,238 | B1 | 6/2003 | Whitesmith et al. |
| 6,696,954 | B2 | 2/2004 | Chung |
| 6,703,935 | B1 | 3/2004 | Chung et al. |
| 6,710,713 | B1 | 3/2004 | Russo |
| 6,720,930 | B2 | 4/2004 | Johnson et al. |
| 6,812,824 | B1 | 11/2004 | Goldinger et al. |
| 6,839,027 | B2 | 1/2005 | Krumm et al. |
| 6,888,459 | B2 | 5/2005 | Stilp |
| 6,888,502 | B2 | 5/2005 | Beigel et al. |
| 6,952,157 | B1 | 10/2005 | Stewart et al. |
| 6,963,270 | B1 | 11/2005 | Gallagher, III et al. |
| 6,989,750 | B2 | 1/2006 | Shanks et al. |
| 6,995,655 | B2 | 2/2006 | Ertin et al. |
| 7,009,562 | B2 | 3/2006 | Jenabi |
| 7,019,639 | B2 | 3/2006 | Stilp |
| 7,057,511 | B2 | 6/2006 | Shanks et al. |
| 7,057,975 | B2 | 6/2006 | Stobbe |
| 7,339,478 | B2 | 3/2008 | Le |
| 7,508,739 | B2 | 3/2009 | Paes |
| 7,589,616 | B2 | 9/2009 | Klatsmanyi et al. |
| 7,605,685 | B2 | 10/2009 | Stewart et al. |
| 7,605,689 | B2 | 10/2009 | Hein et al. |
| 8,085,136 | B2 | 12/2011 | Stewart et al. |
| 8,179,233 | B2 | 5/2012 | Kia |
| 2001/0040895 | A1 | 11/2001 | Templin |
| 2002/0008622 | A1 | 1/2002 | Weston et al. |
| 2002/0008624 | A1 | 1/2002 | Paek |
| 2002/0044057 | A1 | 4/2002 | Zirbes |
| 2002/0044096 | A1 | 4/2002 | Chung |
| 2003/0014678 | A1 | 1/2003 | Ozcetin et al. |
| 2003/0073518 | A1 | 4/2003 | Marty et al. |
| 2003/0163287 | A1 | 8/2003 | Vock et al. |
| 2003/0189484 | A1 | 10/2003 | Rust et al. |
| 2004/0006445 | A1 | 1/2004 | Paek |
| 2004/0100566 | A1* | 5/2004 | Valleriano ................ G07C 1/22 348/231.99 |
| 2005/0093976 | A1 | 5/2005 | Valleriano et al. |
| 2005/0099269 | A1 | 5/2005 | Diorio et al. |
| 2006/0097847 | A1 | 5/2006 | Bervoets et al. |
| 2006/0097874 | A1 | 5/2006 | Salesky et al. |
| 2006/0103536 | A1 | 5/2006 | Kwak et al. |
| 2006/0176216 | A1 | 8/2006 | Hipskind |
| 2007/0076528 | A1 | 4/2007 | Kirby |
| 2007/0097969 | A1 | 5/2007 | Regnier |
| 2007/0182567 | A1 | 8/2007 | Stewart et al. |
| 2007/0252770 | A1 | 11/2007 | Kai et al. |
| 2007/0262871 | A1 | 11/2007 | Yamagajo et al. |
| 2007/0272011 | A1 | 11/2007 | Chapa, Jr. et al. |
| 2008/0018479 | A1 | 1/2008 | Hashimoto et al. |
| 2008/0021676 | A1 | 1/2008 | Vock et al. |
| 2008/0111695 | A1 | 5/2008 | Yamagajo et al. |
| 2008/0139263 | A1 | 6/2008 | He et al. |
| 2008/0143620 | A1 | 6/2008 | Khatri |
| 2008/0246615 | A1 | 10/2008 | Duron et al. |
| 2008/0246616 | A1 | 10/2008 | Sakama et al. |
| 2008/0284654 | A1 | 11/2008 | Burnside et al. |
| 2008/0316032 | A1 | 12/2008 | Kia |
| 2009/0015377 | A1 | 1/2009 | Fogg et al. |
| 2009/0184806 | A1 | 7/2009 | Kia |
| 2009/0231198 | A1 | 9/2009 | Walsh et al. |
| 2009/0284368 | A1 | 11/2009 | Case, Jr. |
| 2010/0019897 | A1 | 1/2010 | Stewart et al. |
| 2010/0051701 | A1 | 3/2010 | Ogata et al. |
| 2010/0088023 | A1 | 4/2010 | Werner |
| 2010/0271263 | A1 | 10/2010 | Moshfeghi |
| 2010/0295943 | A1 | 11/2010 | Cha et al. |
| 2010/0302910 | A1 | 12/2010 | Howell |
| 2011/0054792 | A1 | 3/2011 | McClellan |
| 2011/0141221 | A1 | 6/2011 | Satterlee et al. |
| 2011/0298583 | A1 | 12/2011 | Libby et al. |
| 2012/0115557 | A1 | 5/2012 | Kia |
| 2012/0230240 | A1 | 9/2012 | Nebat et al. |
| 2014/0052279 | A1 | 2/2014 | Van Rens |

FOREIGN PATENT DOCUMENTS

| | | |
|---|---|---|
| JP | 2006-053655 A | 2/2006 |
| JP | 2008-276353 A | 11/2006 |
| JP | 2008-299535 A | 12/2008 |
| JP | 4394600 A | 10/2009 |
| JP | 2010-088886 A | 4/2010 |
| KR | 10-2002-0008234 A | 1/2002 |
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |
| KR | 10-2010-0119271 A | 11/2010 |
| WO | PCT/US2012/22125 | 1/2012 |
| WO | PCT/US2014/030105 | 3/2014 |
| WO | PCT/US2014/030107 | 3/2014 |
| WO | PCT/US2014/030537 | 3/2014 |
| WO | PCT/US2014/031125 | 3/2014 |

OTHER PUBLICATIONS

PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.

(56) References Cited

OTHER PUBLICATIONS

Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 29, 2011.
PCT Search Report, PCT US 2011-050570, Sep. 6, 2011.
PCT Search Report, PCT US 2012-022126, Jan. 20, 2012.
PCT Search Report, PCT US 2012-022125, Jan. 20, 2012.
PCT Search Report, PCT US 2012-022132, Sep. 14, 2012.
U.S. Appl. No. 61/798,350, filed Mar. 15, 2013.
U.S. Appl. No. 61/800,050, filed Mar. 15, 2013.
U.S. Appl. No. 13/226,408, filed Sep. 6, 2011.
U.S. Appl. No. 13/582,148, filed Aug. 31, 2012.
U.S. Appl. No. 13/521,700, filed Jul. 11, 2012.
U.S. Appl. No. 13/521,664, filed Jul. 11, 2012.
U.S. Appl. No. 13/194,880, filed Jul. 29, 2011.
U.S. Appl. No. 13/980,539, filed Jul. 18, 2013.
U.S. Appl. No. 13/980,675, filed Sep. 11, 2013.
U.S. Appl. No. 13/980,545, filed Jul. 18, 2013.
U.S. Appl. No. 13/957,336, filed Aug. 1, 2013.
U.S. Appl. No. 14/374,753, filed Jul. 25, 2014.
U.S. Appl. No. 14/341,266, filed Jul. 25, 2014.
U.S. Appl. No. 14/374,757, filed Jul. 25, 2014.

\* cited by examiner

US 9,586,124 B2

RFID TAG READ TRIGGERED IMAGE AND VIDEO CAPTURE EVENT TIMING METHOD

CROSS-REFERENCE TO RELATED APPLICATIONS

This application is a Continuation Application of PCT/US12/22126, filed Jan. 20, 2012 that claims the benefit of U.S. Provisional Application No. 61/434,769, filed on Jan. 20, 2011 entitled SYSTEMS AND METHODS FOR IMAGE CAPTURE INTEGRATION AND DETECTION POINT LASER DETECTION IN AN EVENT TIMING SYSTEM, the disclosures of which is incorporated herein by reference.

FIELD

The present disclosure relates to timing systems and, more specifically, to an RFID tag reader enabled timing systems having an integrated image or video capture capability.

BACKGROUND

The statements in this section merely provide background information related to the present disclosure and may not constitute prior art.

When using an RFID system or similar detection technology system for timing sporting events, it often becomes necessary to obtain additional participant information related to a participant in an event. Typically, photographs and video can be taken by a user positioned along the course of the event such as along a particular reference point such as a waypoint or finish line. These users take the photos and associate such with the time of the passing of the participant by the photo point, the name of the participant, or a bib or other participant number or code. The participants are provided with such identifying data and the photos are placed in a database, catalogued, and later accessed by a user by such identifying data. The accessed database can be searched with the photos displayed, and wherein the party doing such searching and displaying can inspect and order the photos, such as via a web site such as provided by U.S. Pat. Nos. 6,985,875 and 7,047,214. It is also possible with certain system that a photovoltaic detection system such as disclosed in U.S. Pat. No. 6,768,094 can be used to electronically trigger a photographic system for taking a photo image participant that passes the trigger mechanism line.

However, such current systems are not integrated into the event timing systems that utilized RFID tag detection and tag reading technology. Furthermore, the current process is limited by both the human factors of attempting to take the photographic image, associating such image with the participant and the identifying data, such as name, time or bib number, and then cataloging in a database for subsequent searching, review and ordering. Such human involvement is labor intensive, is prone to errors, and often receives unsatisfactory reviews by participants. Further, when there are a large number of participants passing a particular event course location, it is impossible for current systems to take photos of every participant and to associate every participant in a photo with a participant identifier for subsequent association and cataloging, thereby limiting the ability of the current system to have photos available for on-line review and ordering by numerous participants. Such systems and limitations also make is very difficult if not impossible for an event photographer to pre-subscribe numerous participants in an event, as the failure rate and complexity in ensuring that such photographers can in fact take an photograph of each pre-subscribed participants that can subsequently be associated, informed, catalogued, accessed, searched, and reviewed.

As such, the inventor hereof has identified a need for an integrated photographic and video image system that is integrated with the RFID tag reader and/or timing system, wherein the RFID tag reads trigger the taking of the photograph or video and automatically associated each and every RFID tag number of such photos or videos.

SUMMARY

The inventor hereof has succeeded at designing systems and methods for automatically capturing photographic and video images of each and every one of a plurality of participants in an RFID tag timed event. The RFID tag reader system triggers the taking of the photographs, or the video based on instructions as to the particular RFID tag number, such that participants can presubscribe for such photos or videos and be ensured that such photos and videos of themselves will in fact to taken and provided to them either in real time or immediately following the event. The present disclosure provides for various embodiments of integrating one or more RFID tag reads of a participant that is traversing an event course or past a timing point as the photo capture or video capture systems, and automatically storing such captured photos or video with each and every participant whose RFID tag was present in such photo or video. A presubscribed participant can immediately have such captured photo or video provided to their predetermined display system in real time, immediately following the event, or for later retrieval.

In one aspect, a system for automatically taking an image of a participant in an event wherein a timing system is used to determine a time of a passing a detection line on a route by a participant having an RFID tag on the participant or an object associated with the participant traveling along the route is disclosed. The system includes a RFID tag reader system configured for communicating with the RFID tag and obtaining the RFID tag number of the RFID tag in one or more RFID tag reads, time stamping each RFID tag read, and transmitting over a communication interface a tag read message including the RFID tag number. The system further includes an image capture device configured for capturing one or more images of one or more participants when in proximity to one of the RFID tag reader monitored points, the image capture device generating image data over a data interface responsive to the capturing of the one or more images. The system also has an image capture system configured for communicating with the timing system and an interface coupled to the image capture device for receiving the generated image message, and creating an image capture message including the image data, and transmitting the image capture message over the communication interface to the timing system. Also included is a timing system configured for receiving the tag read message from the RFID tag reader system and the image capture message, determining the RFID tag number within the tag read messages, associating the image data in the image capture message with the identified participant, and store the image data in a database file that is associated with the determined RFID tag number.

In another aspect, a system for preordering the automatic taking of one or more images of a participant in an event wherein a timing system is used to determine a time of a passing a detection line on a route by a participant having an RFID tag on the participant or an object associated with the participant traveling along the route is disclosed. The system has an image capture preorder system having an interface for receiving a request for a photograph and/or video of the participant prior to or during an event along the route and transmitting the received request. The system also includes a timing system communicatively coupled to the image capture preorder system for receiving the transmitted request and associating the RFID tag number with the image capture request, generating a command for capturing an image associated with the RFID tag number that includes the RFID tag number. The system further includes a RFID tag reader system configured for communicating with the RFID tag and obtaining the RFID tag number of the RFID tag in one or more RFID tag reads, time stamping each RFID tag read, and transmitting over a communication interface a tag read message including the RFID tag number. An image capture device configured for receiving an image capture start command and capturing one or more images responsive to receiving the image capture start command, the image capture device generating image data over a data interface responsive to the capturing of the one or more images is also provided. The image capture system is configured for receiving the image capture demand, generating the image capture start command responsive to receipt of the image capture demand, receiving the generated image message, creating an image capture message including the image data, and transmitting the image capture message over the communication interface to the timing system. The timing system receives the tag read message from the RFID tag reader system, compares the RFID tag numbers of the tag read messages with the RFID tag number of the image capture command. The image capture command is generated by the timing system responsive to the RFID tag number being identified within the RFID tag read messages. The image capture message responsive to the image capture command is received by the timing system and the image data is associated with the RFID tag number of the tag read messages. The image data is stored in a database file associated with the RFID tag number.

In yet another aspect, a method for automatically taking an image of a participant in an event wherein a timing system is used to determine a time of a passing a detection line on a route by a participant having an RFID tag on the participant or an object associated with the participant traveling along the route is disclosed. The method utilizes an RFID tag reader system which operates by communicating with the RFID tag to obtain the RFID tag number of the RFID tag in one or more RFID tag reads. Each RFID tag read is time stamped and transmitted over a communication interface a tag read message including the RFID tag number. The method also utilizes an image capture device that captures one or more images of one or more participants when in proximity to one of the RFID tag reader monitored points. The image capture device generates image data over a data interface responsive to the capturing of the one or more images. The method also utilizes an image capture system which receives the generated image message, creates an image capture message including the image data; and transmits the image capture message. The method also utilizes an a timing system which receives the tag read message from the RFID tag reader system and the image capture message, determines the RFID tag number within the image capture message and associates the image data in the image capture message with the identified RFID tag number. The image data is stored in a database file that is associated with the identified RFID tag number.

In still another aspect, a method for preordering the automatic taking of one or more images of a participant in an event wherein a timing system is used to determine a time of a passing a detection line on a route by a participant having an RFID tag on the participant or an object associated with the participant traveling along the route is disclosed. The method utilizes an image capture preorder system which receives a request for a photograph and/or video of the participant prior to or during an event along the route and transmits the received request to a timing system. The timing system receives the transmitted request from the image capture preorder system and associates the RFID tag number with the image capture request. The timing system generates a command for capturing an image associated with the RFID tag number that includes the RFID tag number. The method also uses a RFID tag reader system which communicates with the RFID tag to obtain the RFID tag number of the RFID tag in one or more RFID tag reads. Each RFID tag read is time stamped and transmitted through a tag read message including the RFID tag number. An image capture device receives an image capture start command and then captures one or more images responsive to receiving the image capture start command. The image capture device generates image data over a data interface responsive to the capturing of the one or more images. An image capture system receives the image capture demand and generates the image capture start command responsive to receipt of the image capture demand. Upon receiving the generated image message an image capture message including the image data is created and transmitted over the communication interface to the timing system. The timing system receives the tag read message from the RFID tag reader system and compares the RFID tag numbers of the tag read messages with the RFID tag number of the image capture command. The timing system then generates the image capture command responsive to the RFID tag number being identified within the RFID tag read messages and receives the image capture message responsive to the image capture command. The timing system then associates the image data with the RFID tag number of the tag read messages; and stores the image data in a database file associated with the RFID tag number.

In another aspect, a system for automatically taking an image of a participant in an event wherein a timing system is used to determine a time of a passing a detection line on a route by a participant having an RFID tag on the participant or an object associated with the participant traveling along the route is disclosed. The system includes a timing system having a processor, a memory, a clock, and a data interface. The system further includes an RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant. As the participant approaches the detection line, the tag reader system transmits a tag read request and receives one or more tag reads including an RFID tag number for the RFID tag when the RFID tag is proximate to one of the monitored points. Each of the RFID tag reads is time stamped and transmitted over the communication interface to the timing system in a tag read message including the RFID tag number and at least a portion of the time stamped RFID tag reads. The system also includes an image capture device configured for capturing one or more images of one or more participants when in proximity to one of the RFID tag reader monitored points, the image capture device generating image data over a data interface responsive to the capturing of the one or more images. The system further has an image capture system having a processor, a memory, a clock, a communication interface for communicating with the timing system and an interface coupled to the image capture device for receiving the generated image message, and creating an image capture message including the image data, and transmitting the image capture message over the communication interface to the timing system. The timing system receives the tag read message from the RFID tag reader system and the image capture message, determines the identity of the participant from the RFID tag number within the image capture message, associates the image data in the image capture message with the identified participant, and stores the image data in a database file that is associated with the identified participant.

In still another aspect, a system for preordering the automatic taking of one or more images of a participant in an event wherein a timing system is used to determine a time of a passing a detection line on a route by a participant having an RFID tag on the participant or an object associated with the participant traveling along the route is disclosed. The system has an image capture preorder system having an interface for receiving a request for a photograph and/or video of the participant prior to or during an event along the route and transmitting the received request. The system also includes a timing system having a processor, a memory, a clock, and a data interface, communicatively coupled to the image capture preorder system for receiving the transmitted request. The timing system associates the participant with an RFID tag number that will be worn by the participant during the event and generates a command for capturing of one or more images associated with the RFID tag number. The image capture command includes the RFID tag number of the participant. Also included is an RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant. As the participant approaches the detection line, the tag reader system transmits a tag read request and receives one or more tag reads including an RFID tag number when the RFID tag is proximate to one of the monitored points. Each of the RFID tag reads is time stamped, and transmitted over the communication interface to the timing system a tag read message including the RFID tag number and at least a portion of the time stamped RFID tag reads. An image capture device configured for receiving an image capture start command and capturing one or more images responsive to receiving the image capture start command is also provided. The image capture device generates image data over a data interface responsive to the capturing of the one or more images. The system utilizes an image capture system having a processor, a memory, a clock, a communication interface for communicating with the timing system, a first data interface coupled to the timing system for receiving the image capture demand, and a second data interface for generating the image capture start command responsive to receipt of the image capture demand. A third interface is coupled to the image capture device for receiving the generated image message, and creating an image capture message including the image data, and transmitting the image capture message over the communication interface to the timing system. The timing system receives the tag read message from the RFID tag reader system, compares the RFID tag numbers of the tag read messages with the RFID tag number of the image capture command. The image capture command is generated by the timing system responsive to the RFID tag number being identified within the RFID tag read messages. The timing system receives the image capture message responsive to the image capture command, associates the image data in the received image capture message with the identified participant, and stores the image data in a database file that is associated with the identified participant.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
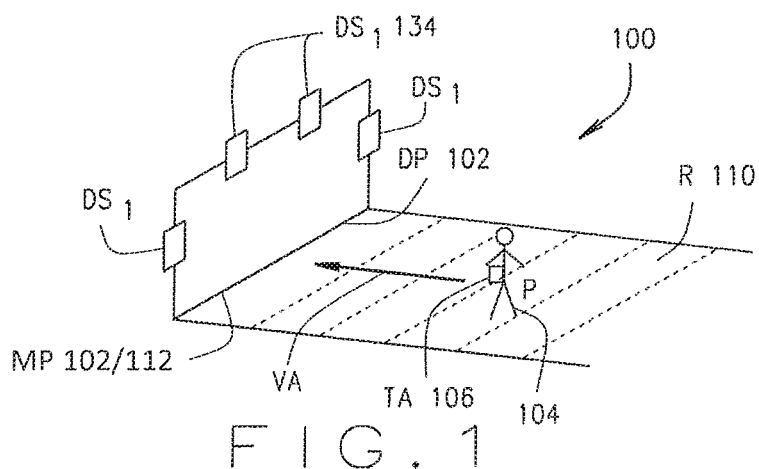
FIG. 1 is a schematic illustration of a typical STS system configuration that is used to read a Race Bib Tag as it passes RFID reader antennas (DS) that are mounted overhead and on the side of a racecourse. The specific location of the antennas could be changed to include any position that is deemed suitable for receiving the Bib Tag signal from the tag according to one exemplary embodiment.

The following description is merely exemplary in nature and is not intended to limit the present disclosure or the disclosure's applications or uses.

In one embodiment a system for automatically taking an image of a participant in an event wherein a timing system is used to determine a time of a passing a detection line on a route by a participant having an RFID tag on the participant or an object associated with the participant traveling along the route is disclosed.

The system include an RFID tag reader system configured for communicating with the RFID tag and obtaining the RFID tag number of the RFID tag in one or more RFID tag reads. Each RFID tag read is time stamped, and transmitted over a communication interface a tag read message including the RFID tag number.

An image capture device configured for capturing one or more images of one or more participants when in proximity to one of the RFID tag reader monitored points is also included. The image capture device generates image data over a data interface responsive to the capturing of the one or more images.

Also included is an image capture system configured for communicating with the timing system and an interface coupled to the image capture device for receiving the generated image message, and creating an image capture message including the image data, and transmitting the image capture message over the communication interface to the timing system.

The system further includes a timing system configured for receiving the tag read message from the RFID tag reader system and the image capture message, determining the RFID tag number within the tag read messages, associating the image data in the image capture message with the identified participant, and store the image data in a database file that is associated with the determined RFID tag number. The timing system is configured to activate the capture of an image by the image capture device and the image capture device is responsive to the timing system. The timing system is also configured to provide the image capture system with the RFID tag number and the image capture system is configured to include the received RFID tag number in the image capture message.

The image capture system is coupled to the RFID tag reader system. The RFID tag reader system and image capture system are configured to activate the capturing of an image by the image capture device when the RFID tag reader system has detected an RFID tag. The image capture system is responsive to the RFID tag reader system.

The RFID tag reader system is configured to provide the image capture system with the RFID tag number and the image capture system is configured to include the received RFID tag number in the image capture message.

The image capture device is coupled to the RFID tag reader system which is configured to activate the capturing of an image by the image capture device when the RFID tag reader system has detected an RFID tag.

The image capture system is configured for coupling to a plurality of image capture devices, and is configured for controlling the image capture by each image capture device. The image capture system is coupled to the RFID tag reader system or the timing system for receiving a command for capturing an image by one or more of the coupled image capture devices.

At least one of the image capture system and the timing system is configured to encrypt the image data prior to storing. The timing system is configured to transmit the stored image data along with the RFID tag number and an identification of the encryption of the image data.

At least one of the image capture system and the timing system is configured to compress the image data prior to storing. The timing system is configured to transmit the stored image data along with RFID tag number and an identification of the compression of the image data.

The RFID tag reader detects a particular RFID tag number approaching the detection line, and the image capture device is activated to capture a video sequence of the participant associated with the RFID tag number as they approach and pass the detection line.

An image capture preorder system having an interface for receiving a request for a photograph and/or video of the participant prior to or during an event along the route and transmitting the received request is provided. The timing system is communicatively coupled to the image capture preorder system for receiving the transmitted request and associating the RFID tag number with the image capture request and generating a command for capturing an image associated with the RFID tag number that includes the RFID tag number.

The image capture device is configured for receiving an image capture start command and capturing one or more images responsive to receiving the image capture start command. The image capture device generates image data over a data interface responsive to the capturing of the one or more images. The image capture system is configured for receiving the image capture demand, generating the image capture start command responsive to receipt of the image capture demand, receiving the generated image message, creating an image capture message including the image data, and transmitting the image capture message over the communication interface to the timing system. The timing system is configured to compare the RFID tag numbers of the tag read messages with the RFID tag number of the image capture command. The image capture command is generated by the timing system responsive to the RFID tag number being identified within the RFID tag read messages. The timing system is configured for receiving the image capture message responsive to the image capture command, associating the image data in the received image capture message with the identified participant, and storing the image data in a database file that is associated with the identified participant.

When the RFID tag reader detects a particular RFID tag number approaching the detection line, the image capture device is activated to capture a video sequence of the participant associated with the RFID tag number as they approach and pass the detection line.

The request includes an identification of one or more requested image outputs for delivering of the captured image data during and after the event. The timing system is configured to transmit the stored image data for the particular RFID tag number to each of the image outputs contained within the request during or after the event responsive to said request.

In another embodiment, a system for preordering the automatic taking of one or more images of a participant in an event wherein a timing system is used to determine a time of a passing a detection line on a route by a participant having an RFID tag on the participant or an object associated with the participant traveling along the route is disclosed. The system has an image capture preorder system having an interface for receiving a request for a photograph and/or video of the participant prior to or during an event along the route and transmitting the received request.

The system also includes a timing system communicatively coupled to the image capture preorder system for receiving the transmitted request and associating the RFID tag number with the image capture request, generating a command for capturing an image associated with the RFID tag number that includes the RFID tag number.

A RFID tag reader system configured for communicating with the RFID tag and obtaining the RFID tag number of the RFID tag in one or more RFID tag reads, time stamping each RFID tag read, and transmitting over a communication interface a tag read message including the RFID tag number is also provided.

The system further includes an image capture device configured for receiving an image capture start command and capturing one or more images responsive to receiving the image capture start command. The image capture device generates image data over a data interface responsive to the capturing of the one or more images.

Also provided is an image capture system configured for receiving the image capture demand, generating the image capture start command responsive to receipt of the image capture demand, receiving the generated image message, creating an image capture message including the image data, and transmitting the image capture message over the communication interface to the timing system.

The timing system receives the tag read message from the RFID tag reader system, compares the RFID tag numbers of the tag read messages with the RFID tag number of the image capture command. The image capture command is generated by the timing system responsive to the RFID tag number being identified within the RFID tag read messages. The timing system receives the image capture message responsive to the image capture command, associates the image data with the RFID tag number of the tag read messages, and stores the image data in a database file associated with the RFID tag number.

A method for automatically taking an image of a participant in an event wherein a timing system is used to determine a time of a passing a detection line on a route by a participant having an RFID tag on the participant or an object associated with the participant traveling along the route is disclosed The method utilizes a RFID tag reader system for communicating with the RFID tag; obtaining the RFID tag number of the RFID tag in one or more RFID tag reads; time stamping each RFID tag read and transmitting over a communication interface a tag read message including the RFID tag number.

The method also uses an image capture device for capturing one or more images of one or more participants when in proximity to one of the RFID tag reader monitored points; and generating image data over a data interface responsive to the capturing of the one or more images and an image capture system: for receiving the generated image message; creating an image capture message including the image data and transmitting the image capture message.

Also utilized is a timing system for receiving the tag read message from the RFID tag reader system; receiving the image capture message; determining the RFID tag number within the image capture message; associating the image data in the image capture message with the identified RFID tag number; and storing the image data in a database file that is associated with the identified RFID tag number.

The timing system is capable of activating the capture of an image by the image capture device. The capturing of the image by the image capture device is responsive to the timing system.

The timing system provides the image capture system with the RFID tag number in the image capture system including the received RFID tag number in the image capture message.

The image capture system receives an input from the RFID tag reader system, and activates the capturing of the image by the image capture device responsive to the received input from the RFID tag reader system. The RFID tag reader system generates a message to the image capture device that it has detected an RFID tag.

In the RFID tag reader system, activating the capturing of the image by the image capture device when the RFID tag reader system has detected an RFID tag and providing an image capture command to the image capture device. At least one of the image capture system and the timing system encrypts the image data prior to storing. The timing system transmits the stored image data along with the RFID tag number and an identification of the encryption of the image data.

At least one of the image capture system and the timing system: compresses the image data prior to storing; and the timing system transmits the stored image data along with the RFID tag number and an identification of the compression of the image data.

The RFID tag reader detects a particular RFID tag number approaching the detection line; and in the image capture device is activated to capture a video sequence of the participant associated with the RFID tag number as they approach and pass the detection line.

Also provided is an image capture preorder system having an interface for receiving a request for a photograph and/or video of the participant prior to or during an event along the route; and transmitting the received request. The timing system that is communicatively coupled to the image capture preorder system receives the transmitted request, associates the RFID tag number with the image capture request; and generates a command for capturing an image associated with the RFID tag number that includes the RFID tag number.

The image capture device is configured for receiving an image capture start command. The capturing of one or more images is responsive to receiving the image capture start command and the generating of image data over a data interface is responsive to the capturing of the one or more images. The image capture system is configured for receiving the image capture demand, generating the image capture start command responsive to receipt of the image capture demand, receiving the generated image message, creating an image capture message including the image data, and transmitting the image capture message over the communication interface to the timing system. The timing system is configured for comparing the RFID tag numbers of the tag read messages with the RFID tag number of the image capture command. The image capture command is generated by the timing system responsive to the RFID tag number being identified within the RFID tag read messages. The timing system receives the image capture message responsive to the image capture command, associates the image data in the received image capture message with the identified participant, and stores the image data in a database file that is associated with the identified participant.

The RFID tag reader is configured for detecting a particular RFID tag number approaching the detection line. The image capture device is configured for activating the capturing of a video sequence of the participant associated with the RFID tag number as they approach and pass the detection line.

The request includes an identification of one or more requested image outputs for delivering of the captured image data during and after the event, and wherein in the timing system, transmitting the stored image data for the particular RFID tag number to each of the image outputs contained within the request during or after the event responsive to said request.

A method for preordering the automatic taking of one or more images of a participant in an event wherein a timing system is used to determine a time of a passing a detection line on a route by a participant having an RFID tag on the participant or an object associated with the participant traveling along the route is disclosed. The method uses an image capture preorder system for receiving a request for a photograph and/or video of the participant prior to or during an event along the route; and transmitting the received request and a timing system communicatively coupled to the image capture preorder system for receiving the transmitted request; associating the RFID tag number with the image capture request, generating a command for capturing an image associated with the RFID tag number that includes the RFID tag number.

The method also uses a RFID tag reader system for communicating with the RFID tag, obtaining the RFID tag number of the RFID tag in one or more RFID tag reads, time stamping each RFID tag read, and transmitting a tag read message including the RFID tag number. The method further uses an image capture device for receiving an image capture start command, capturing one or more images responsive to receiving the image capture start command, and generating image data over a data interface responsive to the capturing of the one or more images.

An image capture system is also used for receiving the image capture demand, generating the image capture start command responsive to receipt of the image capture demand, receiving the generated image message, creating an image capture message including the image data, and transmitting the image capture message over the communication interface to the timing system.

The timing system is used for receiving the tag read message from the RFID tag reader system, comparing the RFID tag numbers of the tag read messages with the RFID tag number of the image capture command, generating the image capture command responsive to the RFID tag number being identified within the RFID tag read messages, receiving the image capture message responsive to the image capture command, associating the image data with the RFID tag number of the tag read messages, and storing the image data in a database file associated with the RFID tag number.

A system for automatically taking an image of a participant in an event wherein a timing system is used to determine a time of a passing a detection line on a route by a participant having an RFID tag on the participant or an object associated with the participant traveling along the route is disclosed. The system includes a timing system having a processor, a memory, a clock, and a data interface; a RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant. As the participant approaches the detection line, the tag reader system transmits a tag read request and receives one or more tag reads including an RFID tag number for the RFID tag when the RFID tag is proximate to one of the monitored points. Each of the RFID tag reads is time stamped, and transmitted over the communication interface to the timing system in a tag read message including the RFID tag number and at least a portion of the time stamped RFID tag reads. An image capture device configured for capturing one or more images of one or more participants when in proximity to one of the RFID tag reader monitored points, and generating image data over a data interface responsive to the capturing of the one or more images is also used.

An image capture system having a processor, a memory, a clock, a communication interface for communicating with the timing system and an interface coupled to the image capture device for receiving the generated image message, and creating an image capture message including the image data, and transmitting the image capture message over the communication interface to the timing system is provided. The timing system receives the tag read message from the RFID tag reader system and the image capture message, determines the identity of the participant from the RFID tag number within the image capture message, associating the image data in the image capture message with the identified participant, and storing the image data in a database file that is associated with the identified participant.

A system for preordering the automatic taking of one or more images of a participant in an event wherein a timing system is used to determine a time of a passing a detection line on a route by a participant having an RFID tag on the participant or an object associated with the participant traveling along the route is disclosed. The system includes an image capture preorder system having an interface for receiving a request for a photograph and/or video of the participant prior to or during an event along the route and transmitting the received request. The system also includes a timing system having a processor, a memory, a clock, and a data interface, communicatively coupled to the image capture preorder system for receiving the transmitted request. The timing system associates the participant with an RFID tag number that will be worn by the participant during the event and generates a command for capturing of one or more images associated with the RFID tag number. The image capture command includes the RFID tag number of the participant. Also included is an RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant. As the participant approaches the detection line, the tag reader system transmits a tag read request and receives one or more tag reads including an RFID tag number when the RFID tag is proximate to one of the monitored points. Each of the RFID tag reads is time stamped, and transmitted over the communication interface to the timing system in a tag read message including the RFID tag number and at least a portion of the time stamped RFID tag reads.

Also provided is an image capture device configured for receiving an image capture start command and capturing one or more images responsive to receiving the image capture start command. The image capture device is adapted for generating image data over a data interface responsive to the capturing of the one or more images.

An image capture system having a processor, a memory, a clock, a communication interface for communicating with the timing system, a first data interface coupled to the timing system for receiving the image capture demand, a second data interface for generating the image capture start command responsive to receipt of the image capture demand, and a third interface coupled to the image capture device for receiving the generated image message, and creating an image capture message including the image data, and transmitting the image capture message over the communication interface to the timing system is used. The timing system receives the tag read message from the RFID tag reader system, compares the RFID tag numbers of the tag read messages with the RFID tag number of the image capture command and generates the image capture command responsive to the RFID tag number being identified within the RFID tag read messages. The timing system receives the image capture message responsive to the image capture command, associates the image data in the received image capture message with the identified participant, and stores the image data in a database file that is associated with the identified participant.

In one embodiment, a participant or third party places a pre-order for having an image, images or video captured or taken of a particular participant at one or more image capture locations on an event course. In such cases, the preorder or registration system provides the TS with instructions or a listing of RFID tag numbers (such as bib numbers). The TS monitors those RFID tag numbers at the various detection points on the course and initiates the capturing of an image or video of the particular participant when such participant's RFID tag number is detected at a desired image capture location or point. In this manner, the image capture system essentially is watching for and ensuring that it initiates the capturing of images and video for those that pre-order such images. This eliminates the need for participants to have to review and order such images after an event. This also provides the ability for third parties to monitor or track and obtain images and/or video of a participant that they wish. Such images and video can be provided directly to the third party designated system or display, such as a broadcast network or webpage or mobile application, immediately upon the capturing of the image or video, even while the event is in progress.

FIG. 1 is a schematic illustration of a typical STS system configuration that is used to read a Race Bib Tag as it passes RFID reader antennas (DS) that are mounted overhead and on the side of an event course. The specific location of the antennas could be changed to include any position that is deemed suitable for receiving the Bib Tag signal from the tag according to one exemplary embodiment. As shown in an exemplary embodiment of FIG. 1, a typical Timing System (TS) for detecting and timing of a participant or object passing a detection point (P) by reading an identification tag (TA) placed on the participant or object (generally referred from hereon as a participant, but meaning both a participant of an object) such as an RFID a Race Bib Tag of a participant as the participant passes detection sensors (DS1) such as RFID detector antenna are mounted overhead and on the side of a race course proximate to the monitored point MP. In some embodiments the DS sensors are mounted under a mat or in a bollard. The specific location of the detection sensors (DS1) could be changed to include any position that is deemed suitable for receiving the Bib Tag signal from the tag according to one exemplary embodiment.

Figure 2:
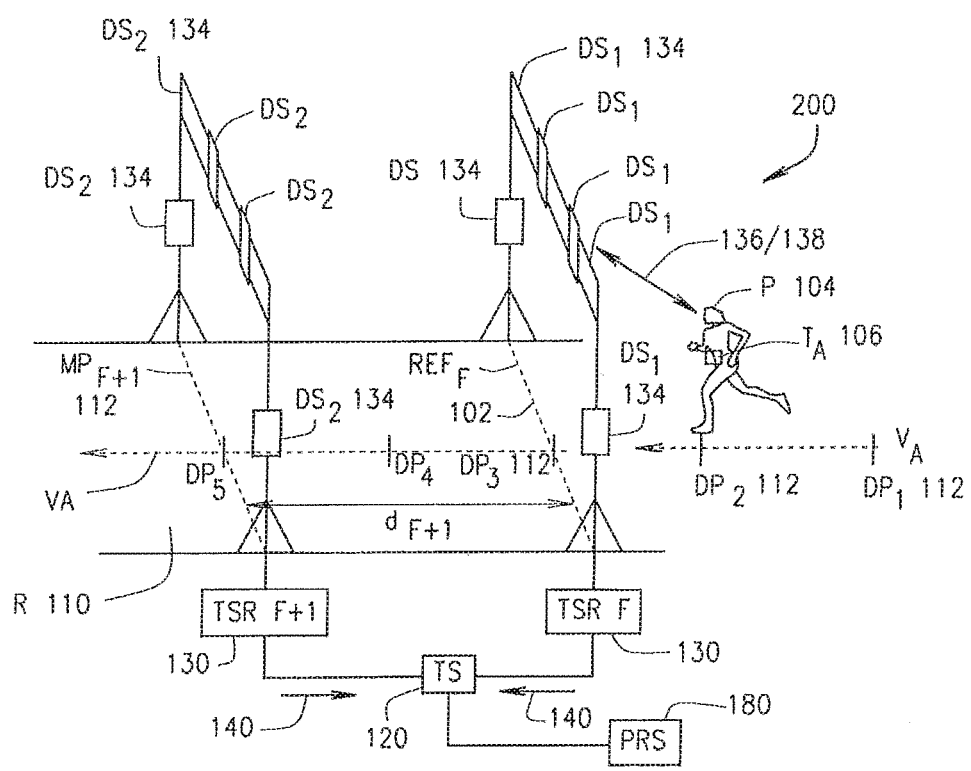
FIG. 2 is a schematic drawing showing an RFID Timing System using redundant RFID tag reader systems (TRS) each with multiple RFID tag reader detection systems (DS) according to one exemplary embodiment, according to a first exemplary embodiment.

FIG. 2 illustrates another RFID TS 200 having two spaced apart RFID tag reading systems, each having a plurality of antenna at a different spaced apart monitored point. In this application, TRSF monitors with RFID antenna DS1 monitored point MPF and TRSF+1 monitors with RFID antenna DS2 monitored point MPF+1 that is space at a distance of DF+1 behind MPF.

Figure 3:
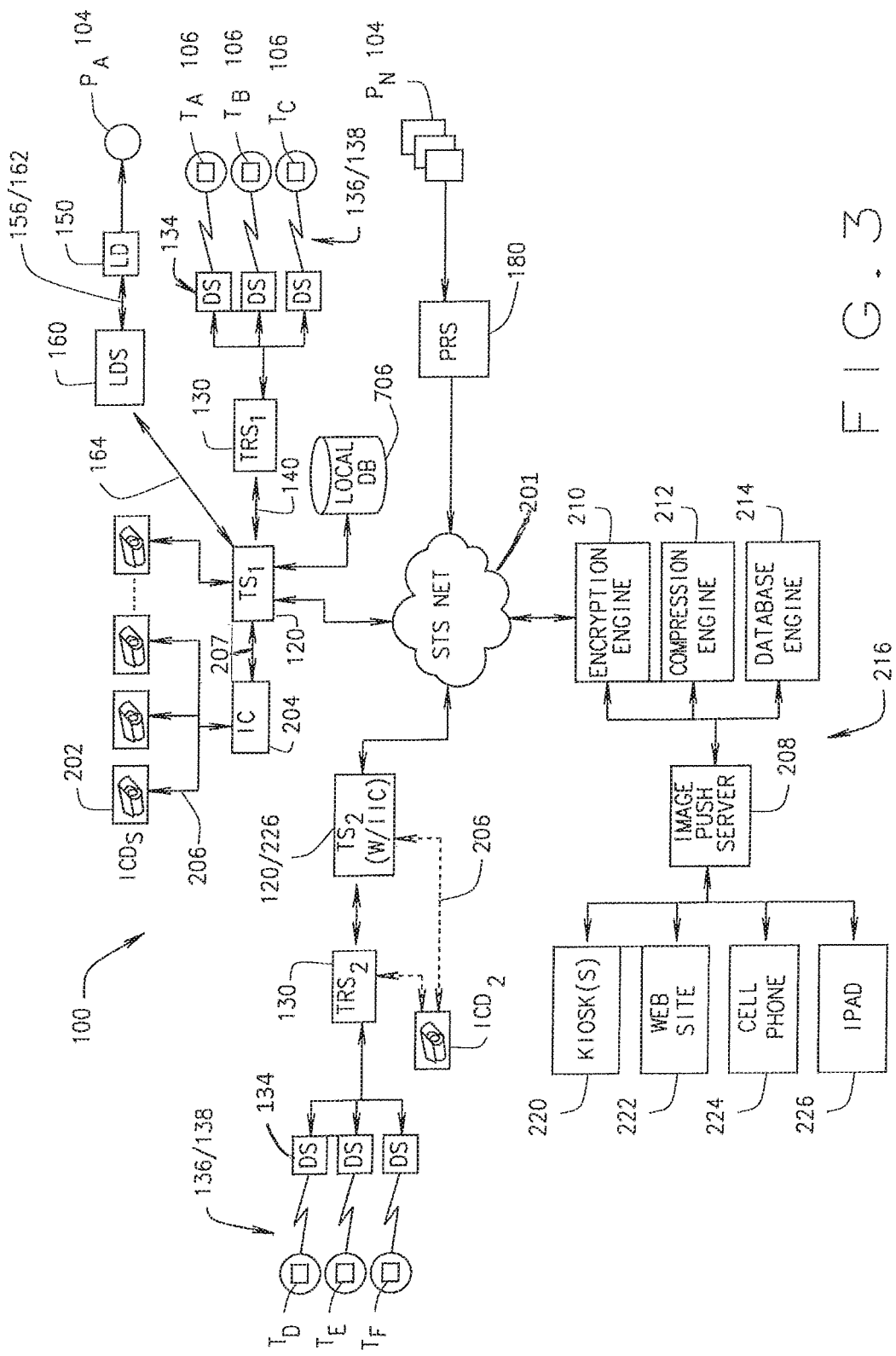
FIG. 3 is a block diagram showing the system architecture of a timing system (STS) with integrated RFID tag read triggering and/or laser detection triggering for capturing and associating a photograph or video according to one exemplary embodiment.

FIG. 3 illustrates a timing system architecture having an integrated RFID tag read triggering and/or laser detection triggering for capturing and associating a photograph or video according to one exemplary embodiment. As shown in FIG. 3, in one embodiment a TS has a new image/video interface and capturing capability that enables the integration of image capture devices (ICDs) that are controlled by an Image Controller (IC) or Image Control System (IS) for integrating with the TS. The interface on TS can be wired, wireless, USB, Ethernet, etc. A TS can support multiple still or video image capture devices ICDs such as cameras connected via various interfaces. For example, in one embodiment, a single STS can received between 4 and 12 image inputs directly and can support higher numbers such as 200 to 300 (such as 255) cameras connected through remote TS devices using an TS interconnecting protocol. A remote device could be another TS system at a different timing/detection point such as at a different point along a racetrack or an assembly line. For example, a race or assembly line may have 5 timing points/detection points along the course or assembly line. One or more ICDs for videos or photos can be placed at one or more or all of each timing point and all such images can be sent back a single TS system such as one at a finish line or main TS system for displaying on image displays or for transferring via a protocol to a webpage, mobile device or as may be desired by the system operator. If a race, the race operator can display an image of a particular participant so that the participant or interested parties can see images of the participant passing a particular detection point, such as the finish line, on a TS announcement display, Kiosk, webpage, or mobile device, after the participant finishes the race. The IC or IS can capture single images as well as video streams and it synchronizes the capture images to the RFID tag read.

When a RFID tag is read, an image is also captured and the two are identified with a common RFID tag number. In other words, the TS database has a field that contains a unique identifier that is typically associated with a participant such as a bib or contestant number. The RFID chip reads and any images or video are all commonly associated and in some embodiments, the image is associated with the RFID tag number of the associated RFID chip read.

The image or video file itself has a file name that contains a unique numeric entry that identified the image. For example, if a race occurs on Jan. 20, 2011 at 11:05:23.014 am in St. Louis, Mo. and the participant identification number (referred herein generally as a bib number) is No. 25, and the number 25 is read by a detection system at a start line, a photo can be captured of participant No. 25 P25 and the "captured image file name" (CIFN) for the image would be "photocap-012011-1105014-001-XX-STL." The first part of this file name represents the type of file . . . in this case a captured photo (photocap). In other embodiments, this could be a "videocap" for a captured video or other type. The next 6 digits of the CIFN are the month, day, and year in 2 digit representations. The next set of digits of the CIFN are HH:MM:SS.MMM with the MMM representing milliseconds, for 1,000th of a second timing accuracy, which is the time of the capture or could be the time of the RFID tag read. As shown in this example, the CIFN does not include colons such uses "–" as a delimiter. Of course other delimiters are also possible.

The next entry in the CIFN is for the camera position or camera identifier to uniquely identify which image capture device captured the image or video. This is shown as a 3-digit field and in one embodiment can include entries from 000 to 255, or more, or could be for more or less digits.

The next two digits of the CIFN are an indicator for the type of encoding and compression the file is using. Here this is shown as a 2-digit value that can represent up to 99 types of compression or encoding schemes, but other indicators are possible. The final CIFN entry is a variable length string that may contain any identifier for the event/race assigned by the user or STS operator. In this example, the identifier is STL reflecting that it was a St. Louis event.

In addition to static capture of photos and streaming video, the herein describe how the TS with the integrated imaging capability enables an event operator, participants, or third parties such as the media or advertisers to such events to subscribe to image/video events and to receive photos or image streams in real time or subsequently. The described TS architecture makes it possible to provide live video feeds to anyone who has need for them. For example, if an event such as a race was being broadcast by a sports television channel, the broadcast company could receive photos or streaming video from the event.

In one exemplary embodiment, a plurality of image capture devices for capturing single images or video (generally referred herein simply as an image) with each being associated with a different detection point.

The image capture devices are integrated with the participant detection systems (DS) of an STS so that an image is captured in coordination with a detection by a detections system (DS) at its detection point. The DS can be an RFID tag reader, laser detection system (LDS), or any other system that can detect the presence of a participant or object within the view of the image capture device (ICD), and can include, in some embodiments, the ICD itself.

The captured image is tagged and transmitted to a STS and stored, or at least a link/address/pointer is stored with the detection info or user info. I would assume that each stored image file can also be tagged as well as the user file including the pointer, at least as an option. The image can be stored with a file name that identifies it such that someone could see a list of file names and know which file (image) they wanted to review. also store a pointer within the user database record that points to the file image. This allows the user to pull up the results for a race participant and also view the images for that person.

Figure 4:
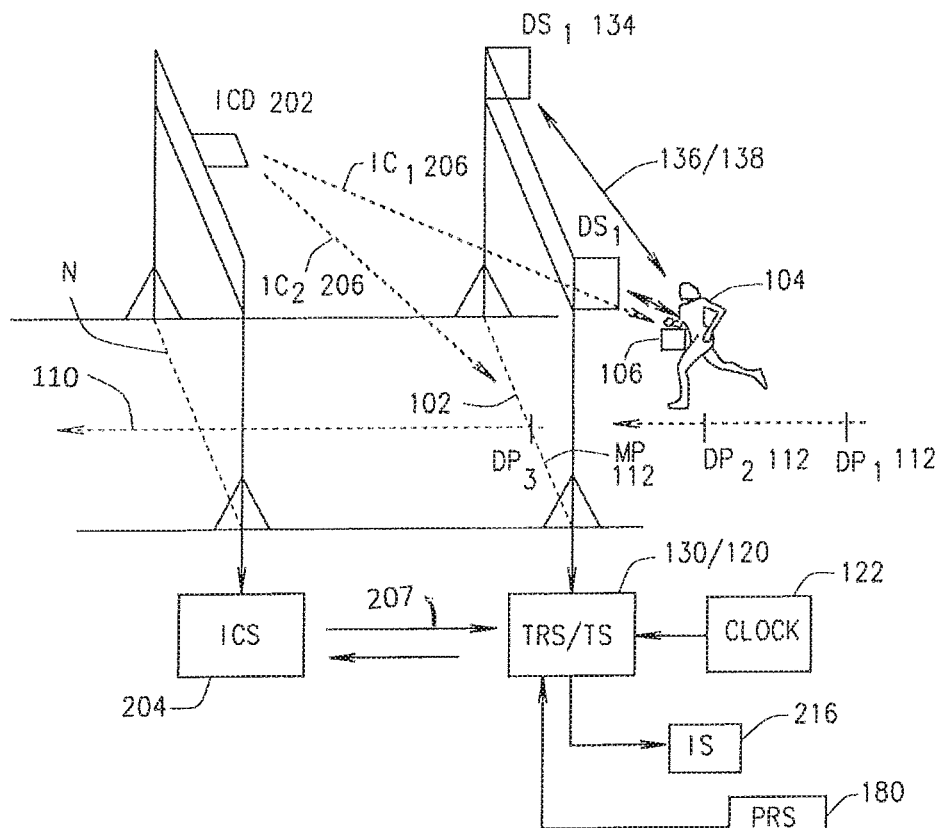
FIG. 4 is schematic illustrating the layout of an event course positioned image capture point having RFID tag readers positioned for triggering the capture and association of a photograph image or video of a passing participant according to one exemplary embodiment.

FIG. 4 illustrates one exemplary on course layout of an event course having image capture devices located behind an RFID tag reader TRS monitored point MP. In this illustration, the participant is detected by the RFID tag reader detectors DS1 at detection points DP1 and then later at DP2. The TRS detects the tag and sends an image capture signal to the Image Control System (ICS) that controls the image capture device ICD. As shown, a first image capture IC1 is taken after the participant is detected by DS1 and TRS at DP1. A second image capture IC2 is taken after the TRS and DS1 detect the RFID tag at DP2. The ICS transmits the captured images IC 1 and IC2 back to the TRS and/or the TS wherein the images IC1 and IC2 are associated with the RFID tag numbers of the RFID tag reads.

Figure 5:
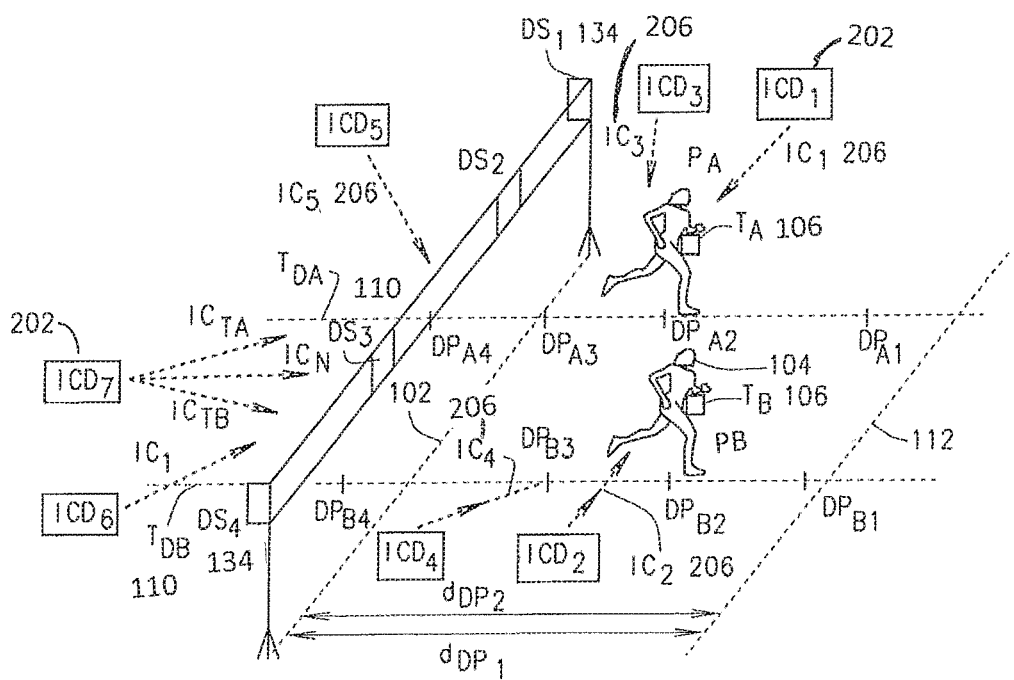
FIG. 5 is schematic illustrating a second layout of a system for an event course positioned at an image capture point having RFID tag readers positioned for triggering the capture and association of a photograph images or videos of two or more passing participants according to one exemplary embodiment.

FIG. 5 illustrates a similar layout as FIG. 4, but having a plurality of image capture devices ICD1 taking IC1, ICD2 taking IC2, ICD3 taking IC3, ICD4 taking IC4, ICD5 taking IC5, ICD6 taking IC6, and ICD7 taking IC7. Also shown are a plurality of runners Pa and Pb, with each having a plurality of RFID tag reader or detection system detection points DPAN and DPBN.

Figure 6:
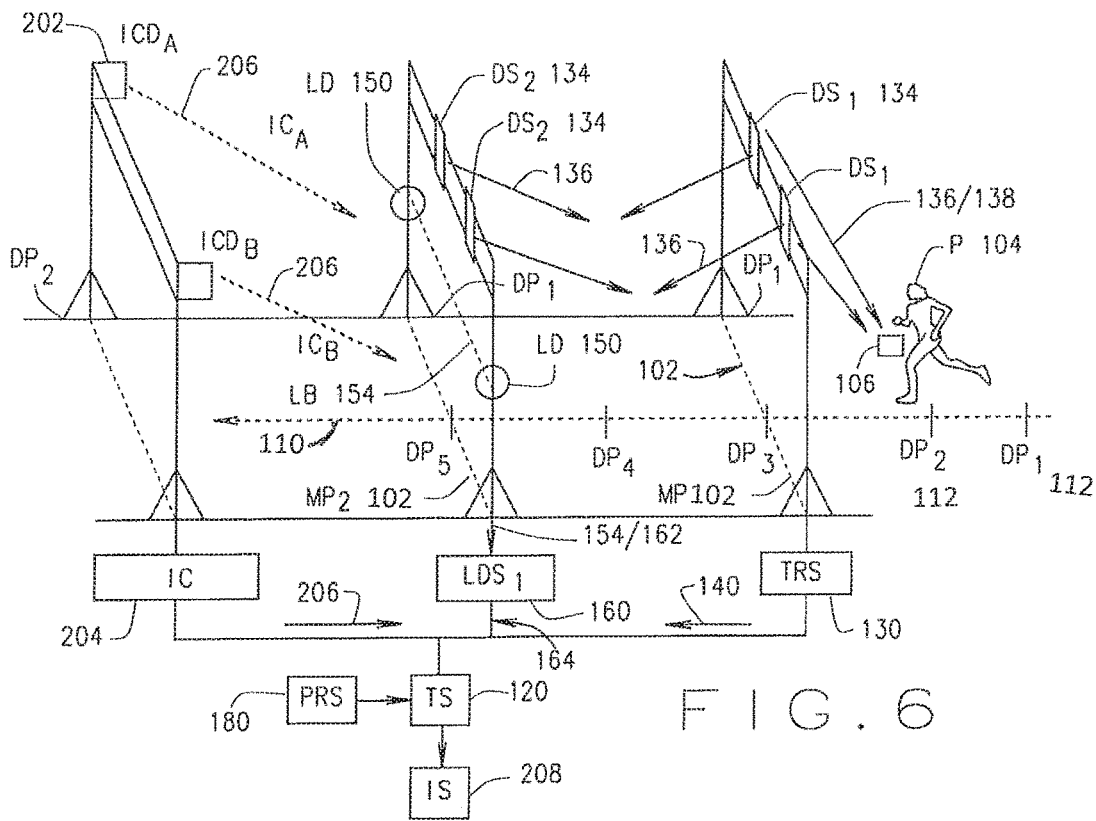
FIG. 6 is schematic illustrating a third layout of a course positioned image capture point having RFID tag readers and a laser detection system, each positioned for triggering the capture and association of a photograph images or videos of passing participants according to one exemplary embodiment.
Figure 7:
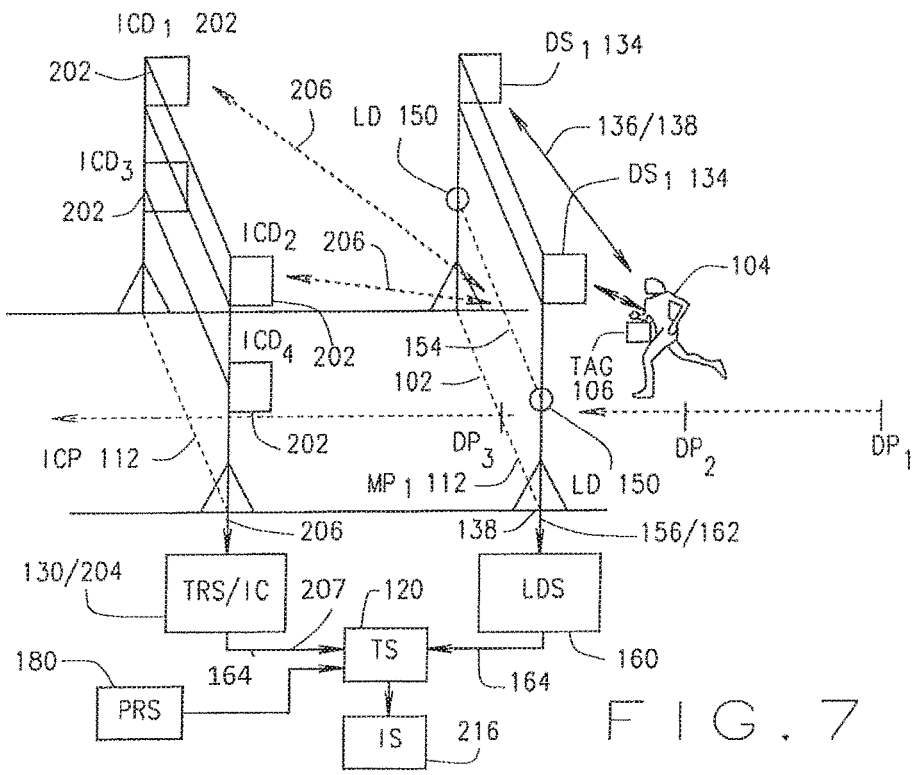
FIG. 7 is schematic illustrating a third layout of a course positioned image capture point having RFID tag readers for participant identification and a laser detection system for triggering the capture and association of a photograph images or videos of passing participants according to one exemplary embodiment.

FIGS. 6 and 7 provide two additional TS layouts each having a different architecture for image capture, but both using, in part, a laser detection system for aiding in the triggering of the image capture, in addition to the RFID tag reads and the TRS or TS identification of the RFID tag numbers associated with each RFID tag and participant.

Figure 8:
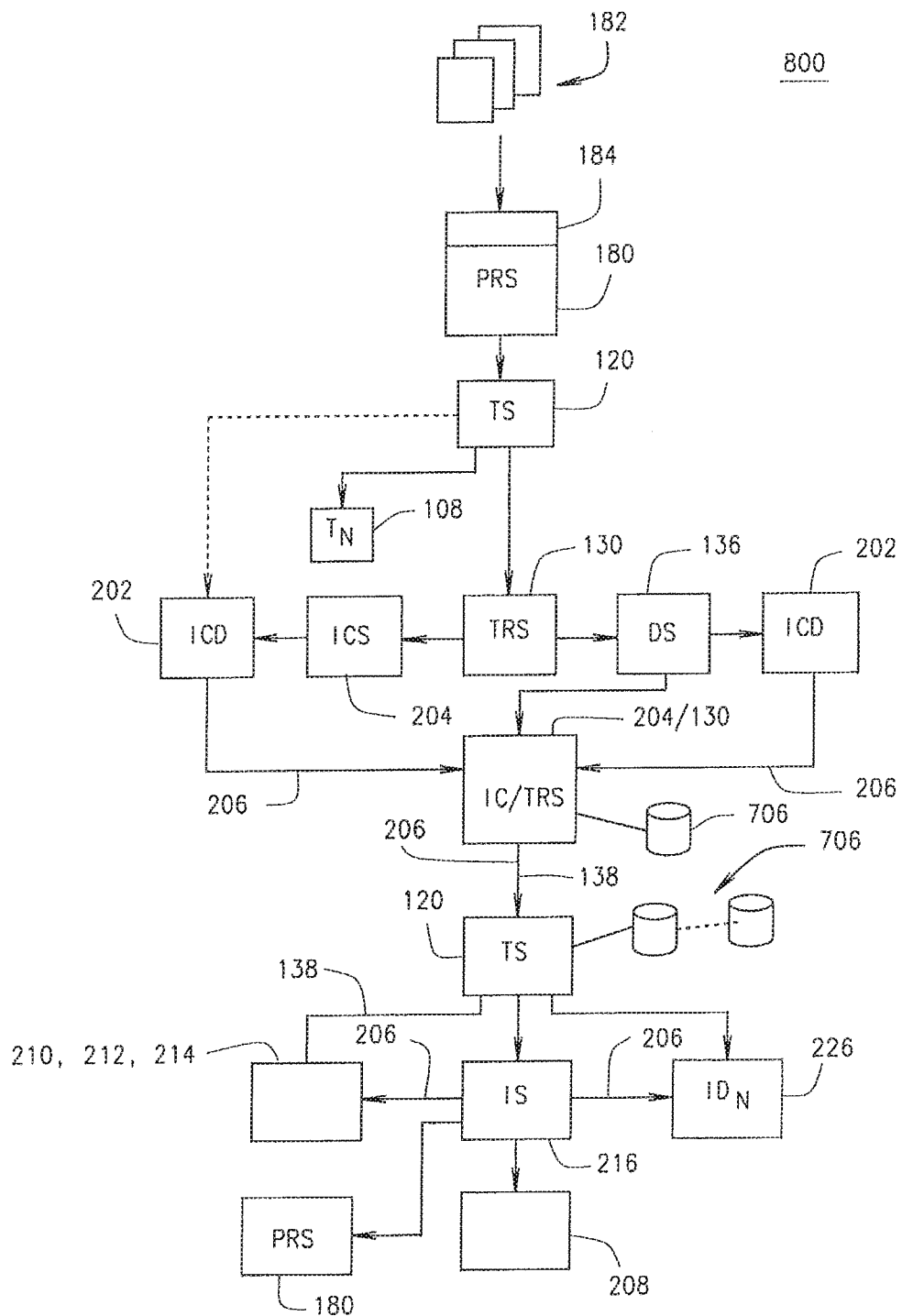
FIG. 8 is a block diagram flow chart illustrating a process for participant preordering of the capture and processing of event photographic images and/or video by a participant in a timed event according to one exemplary embodiment.

FIG. 8 is a block diagram flow chart illustrating a process for participant preordering system PRS. As shown, in block PRS, one or more requests are received for preordering of images either still or video. The request can include the identification of the participant for which images are to be taken, the number of images, the selection of the location for the images to be taken, and the desired delivery system or method for such image delivery. The delivery can be requested as being during an event or following an event. The delivery sites or locations are shown, by way of example, in FIG. 3 to include a local Kiosk, a website, a cell phone, a tablet, or could include a broadcast channel such as a network broadcast station. The PRS provides the request to the TS for the planned capturing, processing and delivery of the preorder images of the particular participant by RFID tag number as provided in the request from the PRS. The TS can provide this information to the RFID tag TN, to the image capture devices ICD, to the TRS, or to the image capture system. The TRS receives an RFID tag detection that is the RFID tag number of the request and can trigger the capturing of the image of the particular participant by one or more ICDs. Once the ICD takes the requested image or video of the particular pre-identified participant based on the identification by the RFID TRS, the captured images and the TRS tag reads with the RFID tag numbers are provided to the TS where they are stored by their RFID tag numbers. Subsequently, the TS transmits the stored image data to an imaging system IS or to one or more outputs as described above, or possibly back to the PRS.

Figure 9:
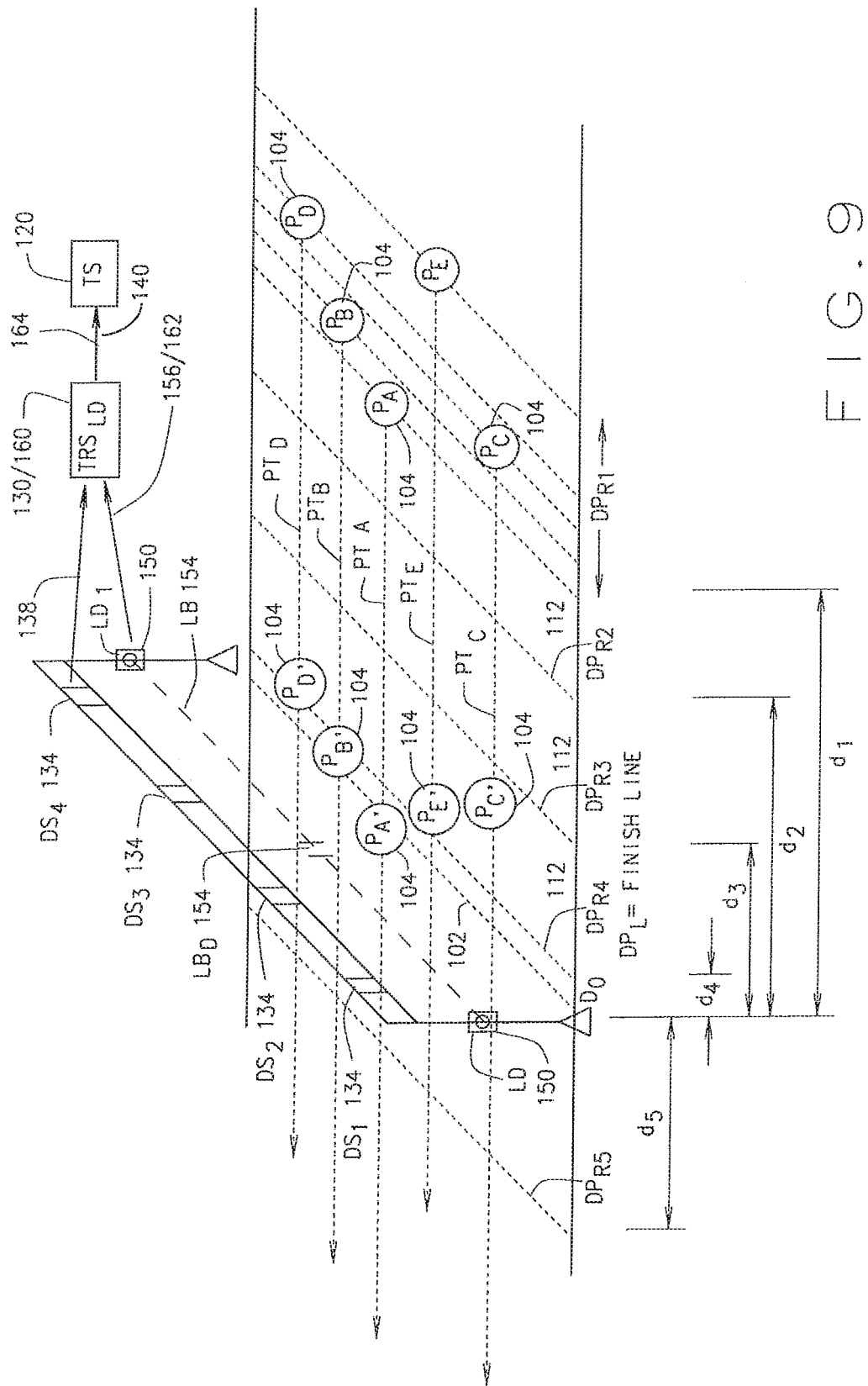
FIG. 9 is a schematic illustration of a TS system using a laser detection system in conjunction with an RFID tag reader for detecting the passing of detecting a plurality of participants passing a detection point in a timed racing event according to one exemplary embodiment.

FIG. 9 illustrates a TS system having a laser detection system in conjunction with an RFID tag reader for detecting the passing of detecting a plurality of participants passing a detection point in a timed racing event according to one exemplary embodiment. As shown, there can be a plurality of participants PN (shown as PA, PB, PC, PD, and PE, each approaching the detection point such as a finish line on course R. Each PN travels along a separate path PTN (shown as PTA, PTB, PTC, PTD, and PTD). The detection systems DS1, DS2, DS3, and DS4 are RFID tag reading antenna that are coupled to TRS and provide for reading of the RFID tag of each PN. The DSN systems first detect the presence of the PN at first detection point DPR1. As shown, each PN is spaced apart and at a slightly different distance from the MP. As the PNs traverse towards the finish line, their positions can change but the DSN continue to read their RFID chips, obtain their times and transmit the chip read data to the TS via the TRS. As shown each of the PA, PB, PC, PD, and PE have moved to a second detection point DPR2, then to a third detection point DPR3 and finally, a first PN reaches the detection point DO. At this point, PA is shown to be in the lead and breaks the laser beam at the detection point DO that is provided by laser detector that is the combination of LD1 and LD. LD1 provides a laser interrupt indicator back to laser detector LD, which is shown in FIG. 9 as being combined with the TRS. The TRS time stamps the receipt of the laser interrupt indicator the same as it does the RFID tag reads. All RFID tag reads and the laser beam interrupt time is sent to the TS.

Figure 10:
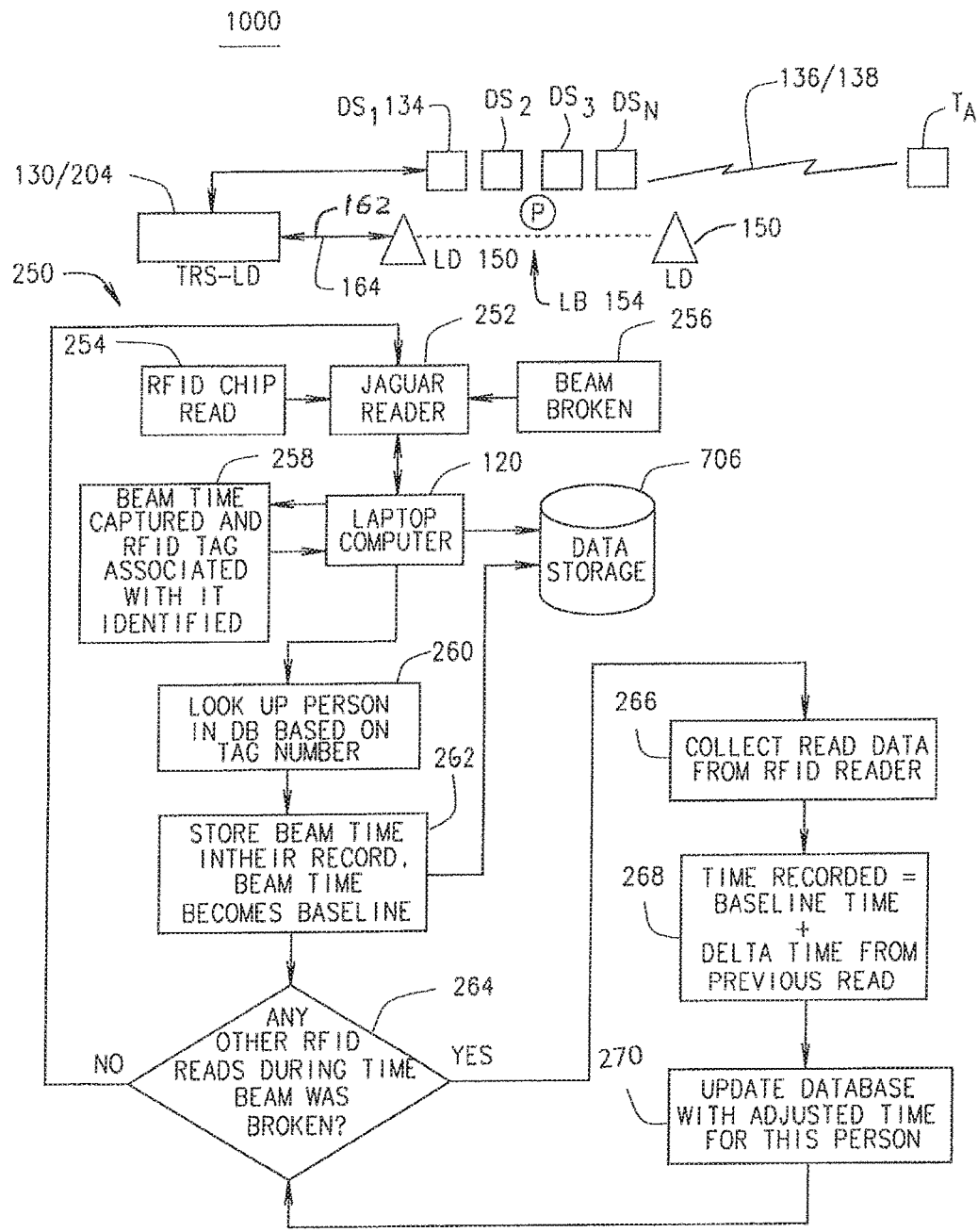
FIG. 10 is a flow chart and illustration for a timing system using a laser detection system in conjunction with an RFID tag reader for detecting an improved accurate time of passing of one or more participants in a timed racing event according to one exemplary embodiment.

Now, as shown in FIG. 10, the timing system, after having receiving the multiple tag reads from the multiple RFID tags from each of the participants, as well as a laser beam interrupt time, determines the participants time for passing the detection point, e.g., the finish line based on the laser beam interrupt time establishing a highly accurate passing of the first PA at the detection point. The process shown in FIG. 10 describes one embodiment for determining the time of each PN during a single laser interrupt event. Of course the laser detectors resent themselves after the all of the PNs pass, and the process of FIG. 10 is repeated for each laser beam interrupt.

Figure 11:
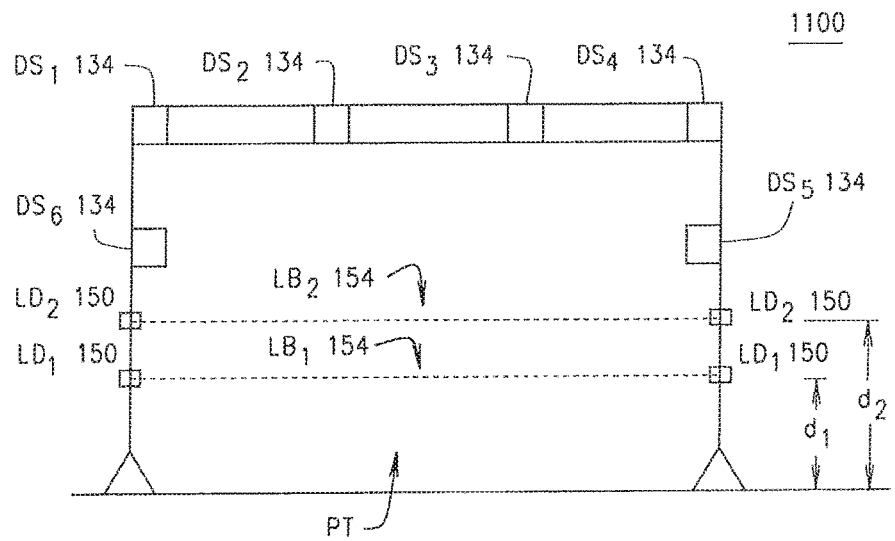
FIG. 11 is a schematic illustration of a TS system using two vertically spaced apart laser detectors tied to a single laser detection system in conjunction with an RFID tag reader for detecting the passing of detecting a plurality of participants passing a detection point in a timed racing event according to one exemplary embodiment.

FIG. 11 illustrates a TS system using two vertically spaced apart laser detectors tied to a single laser detection system in conjunction with an RFID tag reader for detecting the passing of detecting a plurality of participants passing a detection point in a timed racing event according to one exemplary embodiment. As shown, LD1 is positioned at a distance of d1 above the surface of the ground, and LD2 is positioned at a higher distance of d2. In this manner, accuracy of the laser detection at the detection point can be increased and the sensitivity of such detection based on the shape of the object or the height of the leading portion of the object can be minimized.

Figure 12:
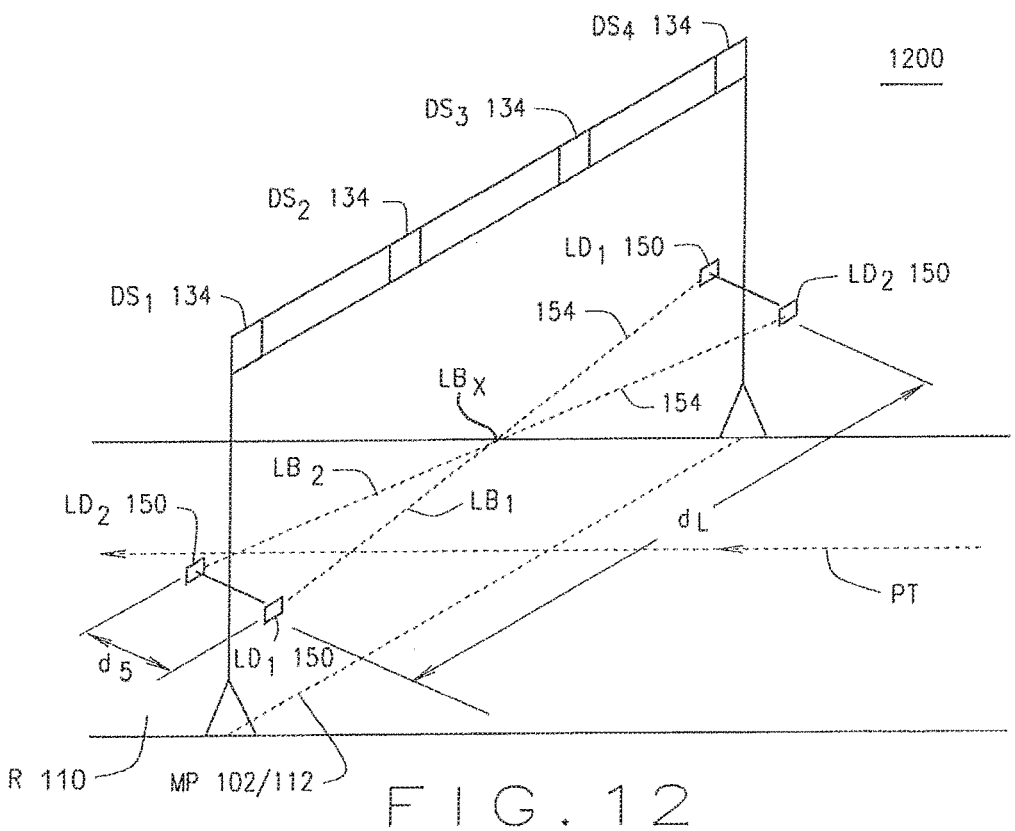
FIG. 12 is a schematic illustration of a TS system using a two horizontally spaced apart laser detectors tied to a single laser detection system wherein the two laser beams are angled across the detection line as used in conjunction with an RFID tag reader for detecting the passing of detecting a plurality of participants passing a detection point in a timed racing event according to one exemplary embodiment.
Figure 13:
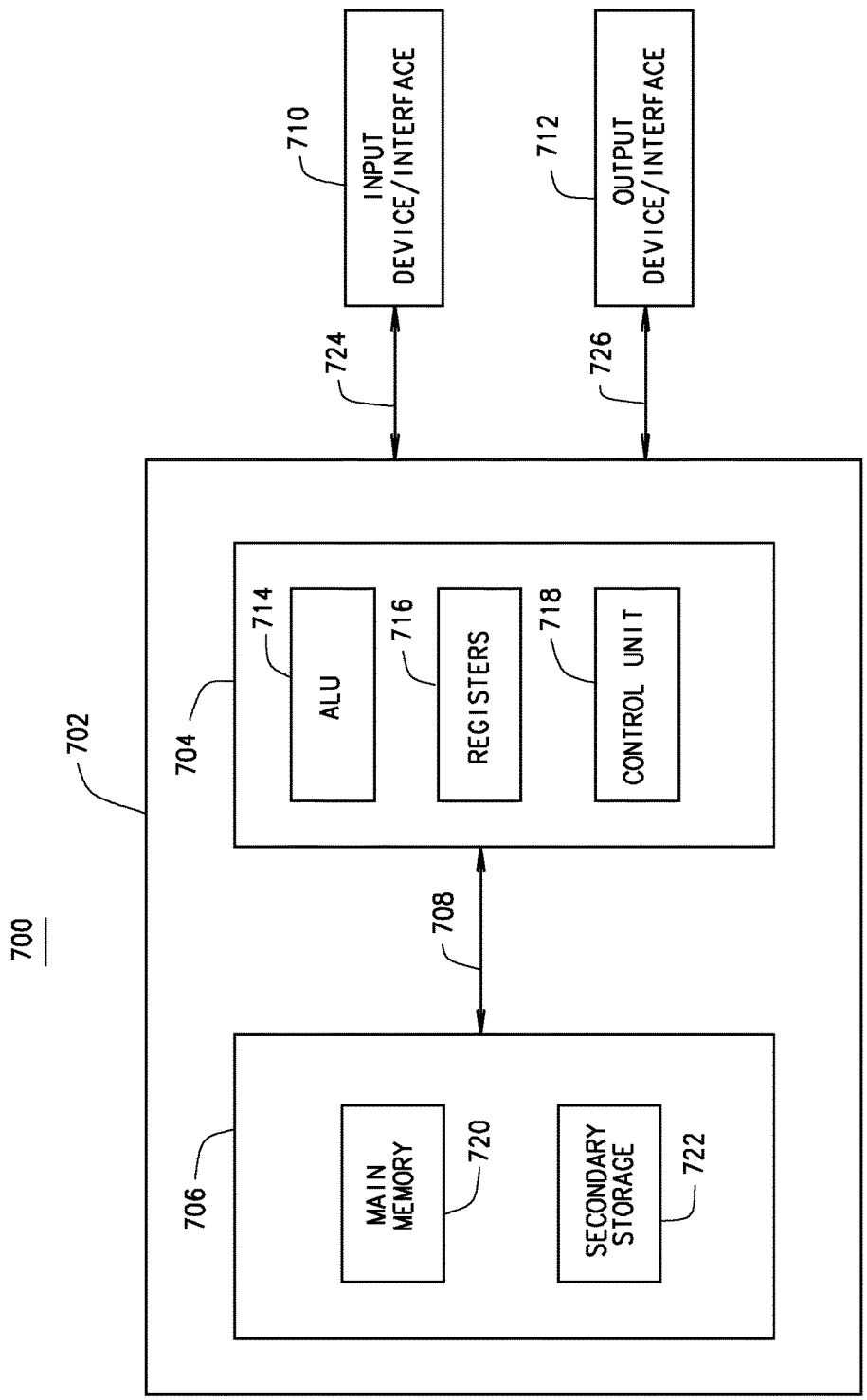
FIG. 13 is a block diagram of a specialized computer system suitable for implementing one or more assembly or methods of various embodiments as described herein.

FIG. 12 is another embodiment of a TS system using a two horizontally spaced apart laser detectors LD1 and LD2 each coupled to a single laser detection system LDS. In this exemplary embodiment, the two laser detectors LD1 and LD2 are spaced apart by a distance of d5 on opposing sides of the gantry on which they are mounted and therefore on opposing sides of the detection point MP. As noted the two ends of the LD1 and LD2 are spaced apart across the course R at a distance of dL. The mated transmitters and receivers of each LD1 and LD2 are also on opposite sides whereby the two laser beams LB1 and LB2 are angled across the detection line and cross in the middle at point MPX. In this manner, LDS system and TS system can utilize the different time stamps for each laser beam break of LB1 and LB2 in determining the timing of the crossing or passing at the detection point. Furthermore, such data can be utilized to determine the first PN to pass the detection line based on their location and the time difference between the two laser interrupts.

The disclosed system utilizes the RFID tag readers TRS that receive the information on a tag and then processing that tag read. The TS uses the tag read to instruct either a still camera or a video camera to record the participant associated with the RFID tag read. In some cases, wherein it is possible to locate the particular participant on the course and distinguish it from the other participants, it is also possible to control or direct a particular camera to take an image or tell a particular video camera to record perhaps 5 seconds of video of a particular specific participant, by focusing in on such participant. It is also proved that the RFID tag reader TRS can detect a participant at a distance before the participant comes within range of the image capture device. In this manner, the present system can be placed perhaps 100 to 200 feet in front of the finish line detection point and the video capture can be activated for the particular participant to take a video of that runner approaching the finish line.

The present TS system can also provide for the taking of a 360 degree photo of the runner at the finish line, or approaching the finish line. In such an embodiment, a plurality of camera (such as 20 cameras) can be placed along the sides of the finish chute, or perhaps in front and/or behind the finish line. Once the RFID tag is detected for the particular participant that desires such an image, 20 photos or video images can be captures from different angles providing the ability to create a full 360 degree image or video of the participant. In this embodiment, the participant can preorder and receive pictures or video from all angles as they finish a race.

The triggering of the capturing of images or video can be done according to a variety of different RFID tag reads. Examples of various processes are shown here, by way of example, and not intending to be limiting:

a) Take X photo(s) from Camera(s) 1 . . . X at the first tag read b) Take X photo(s) from Camera(s) 1 . . . X at the Nth tag read c) Take X photo(s) Camera(s) 1 . . . X for every tag read d) Take X photo(s) Camera(s) 1 . . . X for every tag read that occurs within Y seconds e) Take X photo(s) Camera(s) 1 . . . X for every tag read that occurs from Y to Z seconds f) Take X photo(s) Camera(s) 1 . . . X for the last tag read g) Take X photo(s) Camera(s) 1 . . . X for the last tag read plus Y seconds h) Take X photo(s) Camera(s) 1 . . . X for the any tag read that has a signal strength of X to Y i) Take X photo(s) Camera(s) 1 . . . X for the any tag read that has masked value or address of X to Y j) Capture video from Camera(s) 1 . . . X at the first tag read k) Capture video from Camera(s) 1 . . . X at the Nth tag read l) Capture video from Camera(s) 1 . . . X for every tag read m) Capture video from Camera(s) 1 . . . X for every tag read that occurs within Y seconds n) Capture video from Camera(s) 1 . . . X for every tag read that occurs from Y to Z seconds o) Capture video from Camera(s) 1 . . . X for the last tag read p) Capture video from Camera(s) 1 . . . X for the last tag read plus Y seconds q) Capture video from Camera(s) 1 . . . X for the any tag read that has a signal strength of X to Y r) Capture video from Camera(s) 1 . . . X for the any tag read that has masked value or address of X to Y s) Capture video from Camera(s) 1 . . . X immediately until X tag(s) are read or Y seconds have occurred t) Capture video from Camera(s) 1 . . . X immediately until a specific tag(s) are read or Y seconds have occurred u) Capture video from Camera(s) 1 . . . X immediately until a masked value or address for tag(s) are read v) Capture video from Camera(s) 1 . . . X immediately until told to stop reading Where video is captured, the TS can start the video on an early RFID chip read before the final timed RFID chip read is taken and determined. In this way, the TS can activate the video capture device to capture the video for a period of time before the participant reaches the detection line. As such, any photos or video for a particular participant can show them approaching the detection line as well as the situation or other participants and the relationship between the one participant and the others and the detection line.

The TS system can store the image, images or video in a database record for a given race participant. Such stored image data is linked with all photos or videos for the participant and is associated with the participant RFID tag number such as the bib number. The ITS can generally use any number or data but often uses bib numbers that correspond to RFID tag numbers for storage of timing data. In other cases, it is simply the bib number, since the RFID tag can be programmed to contain the specific bib number of the participant. As such, the participant's times and image information can be contained within the same database record within the ITS. In addition, the ITS can send the image or video over the TS NET or any connected network, and store it on a remote server in the same physical location or at a location that is remote from the TS and the event. The herein described image processing and communication messages can be used for requesting and providing the images and/or video based on a presubscription to such captured data, or as requested or desired for display on a news broadcast, or streamed for broadcasting on a network or other display device. As also identified herein, the IT system and protocol messages use a data identifier or format field for enabling and communicating information related to the compression and/or encryption of the images or video. The described process incorporates compression and encryption, along with a software key code that can be used to unlock the image and to decompress.

In other embodiments, the TS database can be accessing and images or video retrieved based on the identification of the bib number of the participant. This capability is the reverse of the preordered or push server as described herein. Where a participant pre-orders the capturing and providing of the images and/or video, the TS processes the captured images or video according to the instructions provided by the participant or third-party prior to the capturing. Also as discussed, such a preorder system will ensure that the TS system looks for and tracks the RFID tags of the participants that pre-ordered to ensure that such images and video are captured pursuant to such pre-order. The participant does not have to review or request the providing of these preordered images.

In one embodiment, a timing system provides for determining a time of a passing at a reference line of a tracked tag associated with an object/participant traveling along a route, capturing an image of such passing, and integrating the captured image with the determined time for the tracked tag.

The system includes a tag reader system having a processor, a memory, a clock, a communication interface for communicating with a timing system, a radio frequency transceiver for wirelessly communicating with the tag, and one or more antenna coupled to the radio frequency transceiver that are positioned at a first monitored point at a first distance from the reference line, the tag reader system transmitting a tag read request and receiving one or more tag reads from the tag, and transmitting over the communication interface a tag read message including at least a portion of the received tag reads.

The system also includes an image capture device having a processor, a memory, a communication interface for communicating with the timing system, the image capture device capturing the image of the object/participant associated with the tag responsive to the transmitting of the tag read message by the tag reader, and transmitting the captured image to the timing system.

The system further includes the timing system having a processor, a memory, and a data interface, the timing system receiving and storing the tag read message from the tag reader and receiving and storing the captured image from the image capture device, storing the captured image to correspond with the tag read message, and transmitting the captured image over the data interface in association with the tag read message.

In one embodiment, a TS has a new image/video interface that uses a camera to capture images as well as video streams. The interface on TS can be wired, wireless, USB, Ethernet, etc. An TS can support multiple still or video image capture devices such as cameras connected via various interfaces. For example, in one embodiment a single TS can received between 4 and 12 image inputs directly and can support higher numbers such as 200 to 300 (such as 255) cameras connected through remote TS devices using an TS interconnecting protocol. A remote device could be another TS system at a different timing/detection point such as at a different point along a racetrack or an assembly line. For example, a race or assembly line may have 5 timing points/detection points along the course or assembly line. One or more image capture devices for videos or photos can be placed at one or more or all of each timing point and all such images can be sent back a single TS system such as one at a finish line or main TS system for displaying on image displays or for transferring via a protocol to a webpage, mobile device or as may be desired by the system operator. If a race, the race operator can display an image of a particular participant so that the participant or interested parties can see images of the participant passing a particular detection point, such as the finish line, on a TS announcement display, Kiosk, webpage, or mobile device, after the participant finishes the race. The VCIS system can capture single images as well as video streams and it synchronizes the capture images to the RFID tag read.

When a RFID tag is read, an image is also captured and the two are identified with a common pointer to each other. In other words, the TS database has a field that contains a unique identifier that points to the photo or video image tied to a particular chip read.

At the same time, the video file itself has a file name that contains a unique numeric entry that identified the image. For example, if a race occurs on January 20, 2011 at 11:05:23.014 am in St. Louis, Mo. and the participant identification number (referred herein generally as a bib number) is No. 25, and the number 25 is read by a detection system at a start line, a photo can be captured of participant No. 25 P25 and the "captured image file name" (CIFN) for the image would be "photocap-012011-1105014-001-XX-STL." The first part of this file name represents the type of file . . . in this case a captured photo (photocap). In other embodiments, this could be a "videocap" for a captured video or other type. The next 6 digits of the CIFN are the month, day, and year in 2 digit representations. The next set of digits of the CIFN is HH:MM:SS.MMM with the MMM representing milliseconds, for 1,000th of a second timing accuracy, which is the time of the capture or could be the time of the RFID tag read. As shown in this example, the CIFN does not include colons such uses "–" as a delimiter. Of course, other delimiters are also possible.

The next entry in the CIFN is for the camera position or camera identifier to uniquely identify which image capture device captured the image or video. This is shown as a 3-digit field and in one embodiment can include entries from 000 to 255, or more, or could be for more or less digits.

The next two digits of the CIFN are an indicator for the type of encoding and compression the file is using. Here this is shown as a 2-digit value that can represent up to 99 types of compression or encoding schemes, but other indicators are possible. The final CIFN entry is a variable length string that may contain any identifier for the event/race assigned by the user or TS operator. In this example, the identifier is STL reflecting that it was a St. Louis event.

In addition to static capture of photos and streaming video, the herein describe TSIIS enables an event operator, participants, or third parties such as the media or advertisers to such events to subscribe to image/video events and to receive photos or image streams in real time or subsequently. The described TSIIS architecture makes it possible to provide live video feeds to anyone who has need for them. For example, if an event such as a race was being broadcast by a sports television channel, the broadcast company could receive photos or streaming video from the event.

In one exemplary embodiment, a plurality of image capture devices for capturing single images or video (generally referred herein simply as an image) with each being associated with a different detection point.

The image capture devices are integrated with the participant detection systems (DS) of an TS so that an image is captured in coordination with a detection by a detections system (DS) at its detection point. The DS can be a RFID tag reader, a laser detection system (LDS), or any other system that can detect the presence of a participant or object within the view of the image capture device (ICD), and can include, in some embodiments, the ICD itself.

The captured image is tagged and transmitted to a TS and stored, or at least a link/address/pointer is stored with the detection info or user info. I would assume that each stored image file can also be tagged as well as the user file including the pointer, at least as an option. The image can be stored with a file name that identifies it such that someone could see a list of file names and know which file (image) they wanted to review. This can also store a pointer within the user database record that points to the file image. This allows the user to pull up the results for a race participant and view the images for that person.

The TS can provide via the protocol in the patent application that we recently filed, the image based on a request or otherwise to other systems and such image when provide is uniquely associated with the participant and possibly also with a particular tag read for that participant.

The TS system is suitable for use with the herein described STIIS is an event communication system that provides real-time statistics and event participant information to computing devices, web sites, cellular phones, television displays and monitors, and other types of communication devices. The capabilities of the TS system include, but are not limited to the following: (1) interfaces with existing TS timing systems to provide real-time updates of participant information, images and video, on television displays or monitors, (2) provides event clock screens that can show the elapsed event time updated in real-time, (3) provides real-time updates of times on participants at any point on the event course, (4) provides detailed event statistics which are updated in real-time, (5) includes event reports including, but not limited to, total finishers, total males, total females, top 5 male finishers, and top 5 female finishers, (6) provides real-time updates to web sites with event participant results, (7) includes search capabilities for locating individual or groups of participants within an event, (8) provides the ability to generate custom messages for event participants that are displayed as they cross a detection point on the course, (9) includes the ability to generate custom advertising messages that are shown on an event related display such as an event clock, and (10) provides data storage for event results which can be retrieved at any time during the event.

When using a sport timing system (TS) using an integrated communication system (ICS) for timing participants in sporting event, the TS system and method makes it possible to view updated participant information including, but not limited to, finish times, bib numbers, and participant names on one or more large displays. The TS system also displays a real-time event clock display showing elapsed event time. In addition, the TS system provides a real-time update screen of event results that can be used by anyone who is providing event updates over a radio or television station, or who is providing updates over a public address system at the event site. The displays supported by the TS system include flat-panel television screens or monitors that are placed at a finish line or in an area where participants or spectators can see the results. The information displayed on the screens not only includes participant results, it also includes custom messages for each participant, as well as advertising messages from event sponsors. Messages and screen displays can be customized by the user to utilize various font sizes, font types, colors, and the placement of information on the screens. Furthermore, the user can modify screen images to include custom artwork and logos and that information will also be displayed as event results are being updated on the television screens or monitors. The TS system can also update a web site with event results during the event, thus providing a communications tool for publishing event information over the internet.

The TS system utilizes a network to receive messages coming from an TS that may have one or more tag reader or participant detection systems associated therewith. For example, an TS NET communication system enables the sharing of participant and event data among systems in support of sport timing ancillary systems and applications. The TS system can receive messages from multiple systems. Thus, numerous detection systems can be placed at many locations on an event course and information from those systems can be transmitted over a network connection to the TS system. The network interface for the TS system can use a connected or disconnected state-less connection, thus allowing guaranteed or non-guaranteed information delivery, such as a TS NET network interface.

As described herein, an TS system utilizes a network to receive formatted text messages coming from a sport timing system. There are two primary types of messages that can be used when communicating with the TS system. The first type of message provides the event participant information to the TS system. The second type of message provides for time synchronization to make sure that the TS system is using the same time standard as used by the other TS and TS NET communicating systems at the event. The message format for the TS system supports variable length messages that can be customized by the user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP, or as generally defined herein by way of example as TS NET. The TS system listens for messages on an IP address and socket number defined by the user in a configuration screen. Once this has been done, the system listens on the designated IP address and socket for inbound messages. When a message is received, it is processed by TS. Depending on the configuration of the TS system, real-time displays may be formatted and updated with participant or event information. In addition, web site updates may be completed, and reports may be updated, email messages formatted and sent, text messages formatted and sent, and images and videos transmitted and displayed by display devices.

The message type indicator at the beginning of the information packet determines the action taken by the TS system. Participant specific messages will contain the ANNC indictor that contains participant data/information. The end of each message or information packet should always contain an end of message delimiter, for example, as described herein an EOM "|" indicator to ensure that the end of packet can be identified by the TS system. In addition, the "|" character should be used to indicate the end of each field within the information packet. There are no limits on the length of a field within the information packet. Thus, the system can transmit a significant amount of event and participant information within a single message, and can include image and video links or even files.

While the TS system was designed for sporting events, it could be used for any number of other applications that may be associated with multiple detection systems having to work interactively together for a common purpose. Furthermore, while the TS system will be described in conjunction with the current embodiments, it will be understood that they are not intended to limit the TS system to these embodiments. On the contrary, the current design is intended to cover alternatives, modifications and equivalents, which may be included within the spirit and scope of the TS system The TS system components include communications interfaces that can include a pair mated datagram messages, a RQIMAGE requesting an image and a STIMAGE message providing the requested image, and wherein the announcement interface system formats the provided image with the announcement system message, and transmits the announcement system message including the image. In other embodiments, the TS NET interfaces include a pair of mated datagram messages including a RQIDIR message requesting a listing of available images and a STIDIR message providing the requested listing of available images, and wherein the announcement interface system generates the RQIMAGE message responsive to the received STIDIR message.

The TS NET interfaces can include a RQISTREAMON message requesting an image stream be enabled and a RQISTREAMOFF message requesting the image stream be disabled, wherein the requested image stream is received over the first data interface and wherein the announcement interface system formats the received image stream with the announcement system message, and transmits the announcement system message including the image stream.

In yet another embodiment, a method for communicating real-time sporting event and participant announcement information received from a sport timing system (TS), the method including receiving, at an announcement interface system having a processor, a memory, a first data interface communicating over the a stateless packet data communication network with the sport timing system, receiving a multicast datagram ANNC message including an identification of the sport timing system and participant data including a participant identifier for uniquely identifying each participant in the sporting event and participant timing data. The method also includes formatting, in the announcement interface system, the received portion of the participant data into an announcement system message having a predetermined data format. The method further including transmitting, at a second interface of the announcement interface system communicating with an announcement system, the announcement system message including the participant data, the participant identifier, and participant timing data.

The method can include transmitting over the first data interface a datagram message RQIMAGE requesting an image from the sport timing system, and receiving includes receiving a STIMAGE message with the requested image, and wherein formatting includes the received image in the announcement system message, and transmitting includes the announcement system message including the received image.

The method can also include transmitting over the first data interface a datagram message RQIDIR requesting a listing of available images from the sport timing system, wherein receiving includes a STIDIR message with the requested listing of available images, and transmitting at the announcement interface system including the RQIMAGE message responsive to the received STIDIR message.

The method can include transmitting over the first data interface a datagram message RQISTREAMON requesting an image stream over the data communication network and a RQISTREAMOFF message requesting the image stream be disabled, wherein receiving includes receiving the requested image stream over the first data interface, wherein formatting includes the provided image stream with the announcement system message, and transmitting the announcement system message with the image stream.

One TS can access multiple TS files that are used within one or more of the other multiple TS systems including the Chip or TS Output File and the TS Database File. The file formats documented below are subject to change, so please check with us periodically for updates.

A TS system with a coupled participant detection system monitors a detection point and collects the identification of the detected participant and stamps a time of detection for each participant. These are referred by way of example herein as collecting participant and detection data including detection times, which can be written as participant read information to a text file. As described by way of example herein. a "chip" is a timing chip that is associated with a participant in the sporting event. A chip refers to the detection of at particular participant by a particular detection system. While a chip refers generally to an RFID chip and the reader is an RFID reader, those skilled in the art would understand that the reference to an RFID chip or chip, could be any type of tag reader or participant detection at a detection point and still be within the scope of the present disclosure.

A TS system or a user of such TS system can predetermine the name and location for the TS OUTPUT FILE. This file is updated in real-time by the TS system as the event progresses and it contains the following information: Antenna#,Bib#,Bib#, "Time" The file always uses a delimited format, shown here by example using commas as the delimiters, and the time field can be any format, but is shown in this example as having quote marks.

The exemplary format for the TS OUTPUT FILE is readable by a spreadsheet or many third party programs, but other formats are also possible. An TS system can ignore the Antenna # field for many applications as the Antenna# field is often used internally by an TS for uniquely identifying the actual equipment making the detection. The Bib # field appears twice and this is not an accident. This is repeated in this exemplary embodiment as several third-party programs require this format when importing an event timing data file. The final entry is the time of the chip read which is in the format of "HH:MM:SS" or "HH:MM:SS.XXX." As shown in this later example, the format for chip read times can be expanded to include sub-second timing. TS NET communication systems and methods should properly handle time values that may include tenths, hundreds, or thousandths of a second.

In the TS system, the chip number is generally the same as the bib number worn by the participant. Thus, for an event with perhaps 500 participants, the Bib # field may contain a value from 1 to 500. For larger racing events, the Bib # field can be up to 99999 or even up to 500000 or so depending on the requirements as the TS and TS NET systems will support these expanded field lengths.

The following is a sample of a typical TS output file over the TS NET using the HH:MM:SS format:
  0,41,41,"14:27:42"
  0,47,47,"14:27:44"
  0,39,39,"14:27:46"
  0,14,14,"14:27:48"
  0,32,32,"14:27:50"

Each TS is capable of detecting and reading a single chip or participant multiple times as it approaches a timing detection point. Thus, an output file may contain multiple entries for the same chip/participant. The last entry is the final read on a chip. For example, the following output file shows that a single chip was read multiple times as the runner approached the finish line in an event.
  0,32,32,"14:28:20"
  0,32,32,"14:28:21"
  0,32,32,"14:28:22"

In one exemplary embodiment, the output file only contains one entry since most runners can pass through the detection point in one second or less. However, if an event can have a number of walkers, there may easily be 4 to 5 entries for the same timing chip as the walker approaches and goes past the finish line.

As an TS system or detection system reads timing chips, the TS system appends new data to the file and continues to do so during the event. Thus, the file should not be modified or locked while an event or event is ongoing. Such read files can be read once the event is concluded, or while the system is not actively reading timing chips, in order to minimize any negative impact to system performance.

Each TS system coupled with a participant detection system (PDS) can have a high-speed memory with a binary database that runs in the memory and is updated very rapidly when the detection are made such as when chips are being read. When this database is saved to the disk drive, it is written to a text file using a delimited format, such as delimited using commas. When using commas as the delimiters, the file can be read by third-party programs without having to build a complex database interface as such files are common as known to those skilled in the art.

The following is a sample TS DATABASE file record:
  1,Jay_Cooper, 08:00:00,08:15:00,00:00:00,00:00:00,00:00:00,08:4 5:00,00:45:00,50,Half Marathon,M,Allentown, Team Cooper,50001,Club Member,#76435,137

TS can have the ability to automatically write out the TS DATABASE FILE during an event to a file name selected by the TS user. For example, the TS can be specified to have a file written to the disk every 30, 45, or perhaps 60 seconds. In addition to writing the TS DATABASE FILE to the disk, TS can automatically create multiple files that have a unique file name that is based on the current date and time. By having multiple files on the disk, any of the files can be accessed without a concern about TS accessing those files again once they have been created. For example, an TS system can write the database to the disk every 60 seconds with a unique file name. The TS system can specify the base file name as TSDB.txt. When TS writes the file, it creates a file with the following name format:
  TSDB20090501100502.txt There can be multiple TS DATABASE FILES on the disk drive, and there could be hundreds of files by the time the event completes. Each of these files is essentially a unique snapshot of the event results for that moment in time.

The following is the format for the database file:
  Bib#,Name,StartTime,Split1,Split2,Split3,Split4,FinishTime,Elaps edTime,Age,Division,Gender,City,TeamName, ChipField,UserField1,UserField2,UniqueID The Bib # field can contain a value from 1 to 99999 depending on the version of the TS system in use.

The Name can contain the full name and is typically formatted as FIRST NAME LAST NAME with no comma between the first and last name, but may be formatted such as using an underscore or the like. In some embodiments, it is undesirable for particular characters, such as a comma, by way of example, not be included in the name field due to their use as a delimiter where applicable. When an TS system loads the database file, it can use particular characters such as a comma to determine the individual fields. Thus, such TS database delineation characters should not be used in the Name field as such usage can cause TS to use the wrong fields for the remaining entries on the line being read.

The following fields all contain a time based on the time of day: Start Time, Split1, Split2, Split3, Split4, and Finish Time. All of these fields are in the format HH:MM:SS or HH:MM:SS.XXX and there are no quote marks.

The described format for chip read times can be expanded to include sub-second timing. Any TS and/or TS NET implementations should be implemented to properly handle time values that may include tenths, hundreds, or thousandths of a second. Following is one exemplary embodiment of a set of applicable TS data fields:

a) The Elapsed Time field is a calculated field that is typically the Finish Time minus the Start Time. This field is in the format HH:MM:SS or HH:MM:SS.XXX and there are no quote marks.

b) The Age field can contain up to 3 digits typically ranging from 1 to 100.

c) The Division field can contain a text entry that can be up to 250 characters in length, although it is typically 20 or less characters long.

d) The Gender field can contain a text entry that can be up to 250 characters in length, although it is typically 1 character with either an M or F entry.

e) The City field can contain a text entry that can be up to 250 characters in length, although it is typically 25 or less characters long.

f) The Team Name field can contain a text entry that can be up to 250 characters in length, although it is typically 25 or less characters long.

g) The Chip field can be used, in some embodiments, to include a text entry that is associated with a particular timing chip. In some embodiments the Chip field can be up to 250 characters in length, although it is expected to be 6 or less characters long.

h) The UserField1 field can contain a text entry that can be up to 250 characters in length, although it is typically 25 or less characters long. This field may be used by the software to contain values related to team order for relay events. In some cases, the TS user can place information in this field related to the TS user's personal information such as emergency contact number.

i) The UserField2 field can contain a text entry that can be up to 250 characters in length, although it is typically 25 or less characters long. This is a second field that often contains additional personal information about an event participant.

j) The UniqueID field can contain a text entry that can be up to 250 characters in length, although it is typically 10 or less characters long. This field is often used to track event-day registration numbers or other unique values that identify an event participant. TS can automatically insert a unique value in this field during the rapid registration process in the software.

Not only can TS write this TS DATABASE FILE text file to the disk drive, it can read it back in from the TS DATABASE FILE. Thus, a TS DATABASE FILE can be created using this format and TS can read it just fine. Any time fields that are created should be in the HH:MM:SS or HH:MM:SS.XXX format with leading zeros on any times that are less than 10. For example, if the time is 9:10 am, the field should contain the entry 09:10:00 or 09:10:00:000. In most cases, when creating a new file that can be loaded into TS, the time fields should contain 00:00:00 or 00:00:00:000. However, if an event has assigned start times, the start times can be loaded into TS by using the StartTime field.

The TS can have a state-less network interface such as provided by a user data protocol (UDP) system as used for outbound and inbound messaging over a suitable communication network. The TS and TS NET systems utilize these messages to include outbound packets using TS and TS NET for READ and ANNOUNCE information, as well as other data as described herein. In addition, an TS using TS NET monitors the Internet connection for UDP TS NET messages from other TS NET systems or third-party programs coupled to the same communication network. This interface allows third-party programs to be developed which can work within the TS architecture.

UDP packets as used by the present TS NET system provide a very quick and relatively easy system to implement and from which to build flexible and robust applications. While there are known limitations for UDP packets, the describes application of the UDP packets in the TS NET recognizes these limitations and adjusts the design and applications accordingly whereby UDP provides a very suitable solution for communicating between multiple TS systems as well as sport timing auxiliary systems (TAS) in which auxiliary applications can provide vertical applications utilizing the information available within the TS NET system and methods.

The following includes the packet structure for all TS NET supported UDP packets. TS NET can be configured to listen and send on any socket ranging from 5000 to 9999. In addition, TS NET can be set to send to a specific computer by using either the computer name or its IP address. Furthermore, TS NET can send to all computers on the network by using 0.255 as the last bytes in the IP address. Of course in other systems and embodiments other broadcast messaging address can also be used and still be within the scope of the present invention. In this example, if the TS NET is set to 192.168.1.255, the TS NET sends messages as Broadcast packets. TS NET message are sent as clear text contained within the UDP packet, with fields separated by the "|" characters. |EOM| should always come at the end of each message.

As noted, the TS NET network interface is configured for stateless broadcast communications systems, such as UDP using a broadcasting IP address indicator such as 255. The networking interface can however support a variety of different types of messages. These can include broadcast messages, multicast messages and unicast messages, between and among various TS NET systems.

Broadcast TS NET messages are transmitted from the TS NET interface over the stateless broadcast communication network with no addressing as to the intended recipient as well as no identification the TS NET system that is sending or sent the message. As such, each of the Broadcast TS NET Messages can be read by any listening TS NET device, and once received by that device, the receiving TS system does not know which other TS system sent the message. As will be discussed, these include, by way of example, the ANNCM and TRSTART messages.

Multicast TS NET messages are transmitted from the TS NET interface over the stateless broadcast communication network with no addressing as to the intended recipient. However, these messages include an identification of the sending TS system, e.g., FROM identifier. These TS NET multicast messages can be read by any TS NET system and once received by that TS system, the receiving TS system knows which of the other communicating TS systems the message originated. These include, by way of example, the ANNC, ANNCL, READ, NOANNC, TSYNC, RSIG, and KREFRESH messages.

Unicast TS NET messages are transmitted from the TS NET interface over the stateless broadcast communication network with an identification of which the sending entity is (FROM identifier) as well as an identification of the intended receiving TS system (DEST or Destination identifier). These unicast TS NET messages are essentially point to point messaging within a stateless broadcast messaging communication system. Only the identified destination TS NET system should receive these messages and they are ignored by all other listening TS system. The receiving TS system knows that the message was intended for its use and it knows the identification of the sending TS. These include, by way of example, the REANNC, RESEND, LOOKUP, STARTRFID, STOPRFID, COMMAND, RQIMAGE, STIMAGE, RQIDIR, STIDIR, RQISTREAMON, and RQISTREAMOFF messages by way of example.

It should be understood to those skilled in the art that other broadcast, multicast and/or unicast messages can also be developed as an application may require or benefit from the present disclosure, and still be considered within the scope of the present disclosure.

Announce Message (ANNC): The ANNC packet is sent by TS NET to the network and can be captured by any device that is listening on the network for UDP packets. The message indicates that TS can have read a chip at the location indicated in the From field.

Packet length=variable size
Total fields=10
ANNC|FROM|BIB#|NAME|AGE|GENDER|CITY|TIME|PACKET#|EOM|

The information in this TS NET packet comes from the TS internal database. The packet # is a unique 3-digit value that begins with 1 and continues to 999, after which it wraps around and starts over at 1. This packet # can be used to ensure that all messages are received. If a message is missing, a request can be made to resent that packet. TS NET maintains a circular buffer of past messages for this purpose.

Announce Message for Lap Events (ANNCL): The ANNCL packet is sent by TS NET to the network and can be captured by any device that is listening on the network for UDP packets. The message indicates that TS can have read a chip at the location indicated in the From field.

Packet length=variable size
Total fields=11
ANNCL|FROM|BIB#|NAME|AGE|GENDER|CITY|TOTAL LAPS|TIME|TEAM NAME|PACKET#|EOM|

The information in this TS NET packet comes from the TS internal database. The packet # is a unique 3-digit value that begins with 1 and continues to 999, after which it wraps around and starts over at 1. This packet # can be used to ensure that all messages are received. If a message is missing, a resend of the packet can be requested. TS NET maintains a circular buffer of past messages for this purpose.

Re-Announce Message (REANNC): The REANNC packet can be sent by TS NET to request a re-send of a particular packet.

Packet length=variable size
Total fields=5
REANNC|FROM|DEST|PACKET#|EOM|

When this TS NET message is used, the packet number should be included as desired from the TS or TS NET buffer. The FROM and DEST fields contain the IP addresses for the two systems.

No Announce Information (NOANNC): The NOANNC packet is sent via the TS NET when a request was made for a packet that is not yet available. For example, if TS NET can only send 100 packets, and a system requests packet number 120, the system will generate the NOANNC message in response.

Packet length=variable size
Total fields=10
NOANNC|FROM|0|0|M|00:00:00|Packet #|EOM|

The message returns the requested packet number with the NOANNC header.

Announce Message Information (ANNCM): The ANNCM packet is sent by TS NET or the Kiosk when a new message is received by an input such as is entered by a participant or family member requesting a specific participant's data be displayed on a Kiosk or an Announcer screen.

Packet length=variable size
Total fields=4
ANNCM|BIB #|MESSAGE|EOM|

Read Message (READ): The READ packet is sent by TS NET to the network and can be captured by any device that is listening on the network for UDP packets. The packet is a real-time feed of any reads that are occurring at the particular TS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND): The RESEND message is sent to any TS system requesting that it re-send a past message. If a message is lost over the network, a request to resend can be made for any of the last 999 messages sent previously. TS NET maintains a buffer with the past 999 messages. Once the 999 position is used, TS NET starts over at position 1. Thus, TS NET is maintaining a circular buffer of messages.

Packet length=variable size
Total fields=5
RESEND|FROM|DEST|PACKET #|EOM|

The Destination field is the TS system that should respond to this request. This is the same name set in the TS Defaults for "My Name" in the networking section. If a request is made for a packet number that has not yet been used by TS NET, a packet response starting with the BLANK field can be received.

Time Sync Message (TSYNC): The TSYNC message is sent using TS NET to any TS system that is listening for Time Sync commands. This is typically used by TS Remote to make sure the time on the Remote laptop is the same as that on the TS system. There can always be a slight delay in the network transmission, and as such a 0.25 to 0.5 second delay may be added to the time received using TS NET to compensate for the delay.

Packet length=variable size
Total fields=4
TSYNC|FROM|TIME|EOM|

The FROM field is the name set in the TS Defaults as My Name.

Time Sync Message (TRSTART): The TRSTART message is sent using TS NET to the Kiosk to set the start clock for the event. The start time can be set on a Kiosk using a command in the Configuration screen. However, by sending this packet to the Kiosk, the time can be set remotely from a TS system.

Packet length=variable size
Total fields=4
TSYNC|TIME|EOM|

Remote Signal Message (RSIG): The RSIG message is sent using TS NET to any system that is listening for RSIG command. This is typically used by TS Remote to make sure the connection over the network is good to TS NET and also to verify that TS NET is scanning and listening for remote entries.

Packet length=variable size
Total fields=4
RSIG|FROM|TIME|EOM|

The FROM field is the name set in the TS Defaults as My Name.

Refresh KIOSK Message (KREFRESH): The KREFRESH message is sent using TS NET to any system (typically a Kiosk) that is listening for the KREFRESH command. This is typically used by TS NET to send out all of the results in an event to the Kiosk. This might be useful if the Kiosk re-booted or if the Kiosk was started after results had already occurred in an event Packet length=variable size
Total fields=10
KREFRESH|FROM|BIB#|NAME|AGE|GENDER|CITY|TIME|PACKET#|EOM|

The information in this TS NET packet comes from the TS internal database. The packet # is a unique 3-digit value that begins with 1 and continues to 999, after which it wraps around and starts over at 1. This packet # can be used to ensure that all messages are received. If a message is missing, a request that packet be re-sent can be made. TS NET maintains a circular buffer of past messages for this purpose.

Lookup Message (LOOKUP): The LOOKUP message allows a device to request event information from another device. The identifier may be any text. In most cases, the identifier will be a tag serial number, event bib number, participant name, or perhaps a unique identifier that refers to a particular type of information. For example, if a TS systems needs to know the current duration of an event, the LOOKUP message could be sent to a TS system that is responsible for tracking the total event time. The identifier field might contain the text entry "EVENTTIME" and this entry could be used to indicate that the event duration is desired. The packet number field is optional and if not used, the field could contain a single space.

Packet length=variable size
Total fields=6
LOOKUP|FROM|DEST|IDENTIFIER|PACKET #|EOM|

Start RFID Message (StartRFID): The StartRFID message can be sent to a TS system to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use. Other systems could include: laser detection, video detection, etc. As such, this message could alternatively be: StartDETECTOR, or StartLASER, or StartVIDEO. by ways of examples.

Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID): The StopRFID message can be sent to a device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc. As such, this message could alternatively be: StopDETECTOR, or StopLASER, or StopVIDEO. by ways of examples.

Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND): The COMMAND message can be sent to a TS system to request that a particular command be executed in that TS system. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET #|EOM|

Request Image Message (RQIMAGE): The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a remote system where a file is located. The DATAFORMAT field may be used to specify the format of the image to be sent, the type of encryption used if any, and/or the type or amount of compaction. If higher performance across a network is desired, this field might be used to indicate that High compression is desired or that 8-bit compression or compaction has been added. If security is required, this could include encrypted with 128-bit encryption format. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSIZE|PSOCKET|PACKET #|EOM|

Image Sent Message (STIMAGE): The STIMAGE message is sent from a system responding to a request for an image, e.g., RQIMAGE. The IDENTIFIER field should contain the unique descriptor for the image that was requested and may contain any text desired. Typically, this field will contain a unique number for a participant in an event. However, the IDENTIFIER could also contain a specific location on a given system where a file is located. The DATAFORMAT field indicates the type of compression, encryption or compaction used on the image or images when it was sent, as discussed above. The PACKETSIZE field should contain a value indicating the length of the portion of the image just sent. Given that most images will contain more data than is able to be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|DATAFORMAT|PACKETSIZE|PSOCKET|PACKET #|EOM|

The DATAFORMAT message maybe something like: COMX2:ENC128:8 BIT, by way of example.

Request Image Library Contents Message (RQIDIR): The RQIDIR message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format. Of course other qualifiers may be used for other formats.

Packet length=variable size
Total fields=6
RQIDIR|FROM|DEST|IDENTIFIER|PACKET #|EOM|

Image Library Sent Message (STIDIR): The STIDIR message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|

Request Image Stream On Message (RQISTREAMON): The RQIDTREAMON message is by a TS system to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The DATAFORMAT field may be used to specify the format to be used when sending the video stream, such as the type of encoding, compression, encryption or compaction used on the video stream as discussed above related to the images. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|DATAFORMAT|PACKETSIZE|PSOCKET|TIMEOUT|PACKET #|EOM|

Request Image Stream Off Message (RQISTREAMOFF): The RQISTREAMOFF message is sent by a TS system to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER|PSOCKET|PACKET #|EOM|

LASER Beam Break Message (LASBMBRK): The LASBMBRK message is sent to a chip or remote system to let it know that a laser beam has been broken at a particular location or laser monitored point MPL. The LSOCKET value can be used to identify a unique socket on the TRS or laser detection system (LDS). The IDENTIFIER can be used to designate a location or identification of the particular LDS. Typically, this value might be a number from 1 to 255. The TIME field will contain a time value indicating when the laser beam break occurred. The BUFFER may contain any other data may be programmed to store and send.

Packet length=variable size
Total fields=8
LASBMBRK|FROM|DEST|LSOCKET|IDENTIFIER|TIME|BUFFER|EOM|

LASER Beam On Message (LASBMON): The LASBMON message is sent to a chip or remote system to let it know that a laser beam should be enabled. The LSOCKET value can be used to identify a unique socket on the TRS or laser detection system (LDS). The IDENTIFIER can be used to designate a location or identification of the particular LDS. Typically, this value might be a number from 1 to 255. The TIME field is optional and could contain a time value indicating when you wish the laser beam to enable itself. If this field is blank, the laser will immediately turn itself on. The BUFFER may contain any other data may be programmed to store and send.

Packet length=variable size
Total fields=8
LASBMON|FROM|DEST|LSOCKET|IDENTIFIER|TIME|BUFFER|EOM|

LASER Beam Off Message (LASBMOFF): The LASBMOFF message is sent to a chip or remote system to let it know that a laser beam should be turned off. The LSOCKET value can be used to identify a unique socket on the TRS or laser detection system (LDS). The IDENTIFIER can be used to designate a location or identification of the particular LDS. Typically, this value might be a number from 1 to 255. The TIME field is optional and could contain a time value indicating when you wish the laser beam to disable itself. If this field is blank, the laser will immediately turn itself off. The BUFFER may contain any other data you wish to send.

Packet length=variable size
Total fields=8
LASBMOFF|FROM|DEST|LSOCKET|IDENTIFIER|TIME|BUFFER|EOM|

LASER Beam Request Message (LASBMREQ): The LASBMREQ message is sent to a chip or remote system to request a particular function be executed. The function could include any number of parameters such as configuring the time necessary to trigger a Beam Break. Another use might be to request a history of all beam breaks during the past 24 hours. The LSOCKET value can be used to identify a unique socket on the TRS or laser detection system (LDS). The IDENTIFIER can be used to designate a location or identification of the particular LDS. Typically, this value might be a number from 1 to 255. The BUFFER may contain any other data may be programmed to store and send.

Packet length=variable size
Total fields=7
LASBMREQ|FROM|DEST|LSOCKET|IDENTIFIER-|BUFFER|EOM|

In other embodiments, the packet formats can vary from that described above and herein and still be within the scope of the present disclosure. For example, some or all of the timing system database fields can be sent when most of the packets are sent. In such embodiments, this can allow applications to have all of the data contained in a record in the database.

Operating Environment

Referring to FIG. 11, an operating environment for an illustrated embodiment of the an RFID semiconductor chip and/or remote transceiver is a computer system 700 with a computer 702 that comprises at least one high speed processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface.

The illustrated CPU 704 for an RFID semiconductor chip is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. The illustrated embodiment of the invention operates on an operating system designed to be portable to any of these processing platforms.

The memory system 706 generally includes high-speed main memory 720 in the form of a medium such as random access memory (RAM) and read only memory (ROM) semiconductor devices that are typical on an RFID semiconductor chip. However, the present disclosure is not limited thereto and can include secondary storage 722 in the form of long-term storage mediums such as floppy disks, hard disks, tape, CD-ROM, flash memory, etc. and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, while not typically provided on RFID tags or chips, an input device 710, and output device 712 can also be provided. The input device 710 can comprise any keyboard, mouse, physical transducer (e.g. a microphone), and can be interconnected to the computer 702 via an input interface 724 associated with the above described communication interface including the antenna interface. The output device 712 can include a display, a printer, a transducer (e.g. a speaker), and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by the user, using computer resources made available through the operating system. Both are typically resident in the illustrated memory system 706 that may be resident on the RFID semiconductor chip.

In accordance with the practices of persons skilled in the art of computer programming, the present invention is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 706. When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A method for automatically taking an image of a particular participant from among a plurality of participants in an event wherein a timing system is used to determine a time of a passing a detection line on a route by the particular participant having an RFID tag that is unique to the particular participant and that is on the particular participant or an object associated with the particular participant traveling along the route, the method comprising:
   a) in a RFID tag reader system:
      communicating with the RFID tag;
      obtaining the RFID tag number of the RFID tag in one or more RFID tag reads;
      time stamping each RFID tag read; and
      transmitting over a communication interface a tag read message including the RFID tag number;

b) in an image capture device:
   receiving an image capture start command from an image capture system;
   capturing one or more images of the particular participant responsive to receiving the image capture start command; and
   generating image data over a data interface responsive to the capturing of the one or more images;
c) in the image capture system coupled to the image capture device for controlling the image capture device:
   receiving a command for capturing the one or more images associated with the RFID tag number of the particular participant, the received command including the RFID tag number of the particular participant;
   transmitting the image capture start command to the image capture device responsive to receiving the image capture command;
   receiving the generated image message;
   creating an image capture message including the image data and the RFID tag number of the received image capture command; and
   transmitting the image capture message;
d) in the timing system:
   receiving the tag read message from the RFID tag reader system;
e) in the timing system or the tag reader system:
   generating the command for capturing the one or more images associated with the RFID tag number that includes the RFID tag number of the particular participant;
f) in the timing system:
   receiving the image capture message from the image capture system;
   determining the RFID tag number within the image capture message;
   associating the image data in the image capture message with the identified RFID tag number and the time stamping of the received RFID tag read message from which the timing system generated the image capture command; and
   storing the image data in a database file that is associated with the identified RFID tag number.

2. The method of claim 1, wherein the timing system generates the image capture command to the image capture system, wherein the capturing of the image by the image capture device is responsive to the timing system.

3. The method of claim 2 wherein the timing system provides the image capture system with the RFID tag number and the time stamping of the received RFID tag read message and the image capture system creates the image capture message to include time stamping of the RFID tag read message.

4. The method of claim 1 wherein the RFID tag reader generates the image capture command to the image capture system, the image capture system receiving the image capture command from the RFID tag reader system, and activating the capturing of the image by the image capture device by generating the image capture start command responsive to the received input from the RFID tag reader system.

5. The method of claim 1 wherein the RFID tag reader system provides the image capture system with the RFID tag number and the time stamping of the RFID tag read included in the RFID tag read message and the image capture system creates the capture image message to include the received time stamping of the RFID tag read.

6. The method of claim 1, wherein in at least one of the image capture system and the timing system:
   encrypting the image data prior to storing;
and in the timing system:
   transmitting the stored image data along with the RFID tag number and an identification of the encryption of the image data.

7. The method of claim 1, wherein in at least one of the image capture system and the timing system:
   compressing the image data prior to storing;
and in the timing system:
   transmitting the stored image data along with the RFID tag number and an identification of the compression of the image data.

8. The method of claim 1, wherein in the RFID tag reader
   detecting the unique RFID tag number of the particular participant as the particular participant is approaching the detection line; and
in the image capture device
   responsive to the receive of the image capture command, activating the capturing of a video sequence of the particular participant associated with the RFID tag number as they approach and pass the detection line.

9. The method of claim 1, further comprising:
in an image capture preorder system having an interface:
   receiving a preorder request for an automatic capturing of a photograph and/or video of the particular participant prior to or during an event along the route; and
   transmitting the received preorder request with the identification of the particular participant from the preorder system to the timing system,
wherein in the timing system that is communicatively coupled to the image capture preorder system:
   receiving the transmitted preorder request;
   associating the RFID tag number of the particular participant with the identification of the particular participant as identified in the image capture preorder request; and
   wherein generating the image capture command is responsive to the associating.

10. The method of claim 9, wherein
and in the timing system:
   comparing the RFID tag numbers of the tag read messages with the RFID tag number of the image capture message and
   associating the image data in the received image capture message with the identified particular participant of the received preorder request, and storing the image data in a database file that is associated with the particular participant and the received preorder request.

11. The method of claim 9 wherein in the RFID tag reader:
   detecting the unique RFID tag number of the particular participant of the preorder request approaching the detection line, and in the image capture device: responsive to the received image capture command, activating the capturing of a video sequence of the particular participant associated with the RFID tag number as the particular participant approaches and passes the detection line.

12. The method of claim 9, wherein the preorder request includes an identification of one or more requested image outputs for delivering of the captured image data during and after the event, and wherein in the timing system, transmitting the stored image data for the particular participant to one or more of the requested the image outputs contained within the preorder request of the particular participant during or after the event responsive to said preorder request.

13. A method for automatic capturing and delivery of one or more images of a particular participant from among a plurality of participants in an event wherein a timing system is used to determine a time of a passing a detection line on a route by the particular participant having a unique RFID tag on the particular participant or an object associated with the particular participant traveling along the route, the method comprising:
   a) in an image capture preorder system:
      receiving a preorder request for capturing a photograph and/or video of the particular participant prior to or during an event along the route; and
      transmitting the received preorder request;
   b) in the timing system communicatively coupled to the image capture preorder system:
      receiving the transmitted preorder request;
      associating the RFID tag number of the particular participant with the preorder request;
      generating a command for capturing an image associated with the RFID tag number that includes the RFID tag number;
   c) in a RFID tag reader system:
      communicating with the RFID tag when the RFID tag is in proximity to the RFID tag reader system to obtain one or more RFID tag read from the RFID tag of the particular participant;
      obtaining the RFID tag number of the RFID tag of the particular participant from the one or more RFID tag reads;
      time stamping each received RFID tag read; and
      transmitting a tag read message including the obtained RFID tag number and the time stamping of each RFID tag read;
   d) in an image capture device:
      receiving an image capture start command from an image capture system;
      capturing one or more images responsive to receiving the image capture start command; and
      generating image data containing the one or more captured images over a data interface responsive to the capturing of the one or more images;
   e) in the image capture system coupled to the image capture device for controlling the image capture device:
      receiving the image capture command including the RFID tag number of the particular participant of the preorder request;
      generating the image capture start command responsive to receipt of the image capture command;
      receiving the generated image message data from the image capture device;
      creating an image capture message including the image data and the RFID tag number of the received image capture command; and
      transmitting the image capture message over the communication interface to the timing system; and
   f) in the timing system:
      receiving the tag read message from the RFID tag reader system;
      receiving the image capture message from the image capture system responsive to the image capture command;
      comparing the RFID tag numbers of the tag read messages with the RFID tag number of the received image capture message;
      associating the received image data with the RFID tag read messages responsive to the comparing identifying the same RFID tag number of the particular participant; and
      storing the image data in a database file associated with the RFID tag number of the particular participant.

14. The method of claim 13, wherein in at least one of the image capture system and the timing system:
   encrypting the image data prior to storing;
and in the timing system:
   transmitting the stored image data along with the RFID tag number and an identification of the encryption of the image data.

15. The method of claim 13, wherein in at least one of the image capture system and the timing system:
   compressing the image data prior to storing;
and in the timing system:
   transmitting the stored image data along with the RFID tag number and an identification of the compression of the image data.

16. The method of claim 13, wherein in the RFID tag reader
   detecting the unique RFID tag number of the particular participant as the particular participant is approaching the detection line;
and in the image capture device
   responsive to the receive of the image capture command, activating the capturing of a video sequence of the particular participant associated with the RFID tag number as they approach and pass the detection line.

17. The method of claim 13 wherein the preorder request for the particular participant include includes an identification of one or more requested image outputs for delivering of the captured image data during and after the event, and wherein in the timing system, automatically transmitting the stored image data for the RFID tag number to one or more of the image outputs contained within the preorder request for the particular participant during or after the event responsive to said preorder request.

* * * * *